United States Patent
Christopoulos et al.

(10) Patent No.: US 8,881,491 B2
(45) Date of Patent: Nov. 11, 2014

(54) COUPLING MEMBER FOR DAMPING VIBRATIONS IN BUILDING STRUCTURES

(76) Inventors: Constantin Christopoulos, Toronto (CA); Michael Montgomery, Toronto (CA)

(*) Notice: Subject to any disclaimer, the term of this patent is extended or adjusted under 35 U.S.C. 154(b) by 0 days.

(21) Appl. No.: 13/979,163

(22) PCT Filed: Jan. 11, 2012

(86) PCT No.: PCT/CA2012/050013
§ 371 (c)(1),
(2), (4) Date: Jul. 11, 2013

(87) PCT Pub. No.: WO2012/094756
PCT Pub. Date: Jul. 19, 2012

(65) Prior Publication Data
US 2013/0283709 A1    Oct. 31, 2013

Related U.S. Application Data

(60) Provisional application No. 61/432,631, filed on Jan. 14, 2011.

(51) Int. Cl.
*E04B 1/98* (2006.01)
*E04H 9/02* (2006.01)
*F16F 7/00* (2006.01)

(52) U.S. Cl.
CPC .. *E04B 1/98* (2013.01); *E04H 9/02* (2013.01); *F16F 7/003* (2013.01); *E04H 9/022* (2013.01)
USPC ....... 52/741.3; 52/167.1; 52/167.3; 52/167.4; 52/167.6; 52/167.7; 52/167.8; 52/167.9

(58) Field of Classification Search
USPC ............... 52/167.1, 741.3, 393, 573.1, 167.3, 52/167.4, 167.6, 167.7, 167.8, 167.9; 188/376
See application file for complete search history.

(56) References Cited

U.S. PATENT DOCUMENTS

| 4,499,694 A | 2/1985 | Buckle et al. |
| 4,761,925 A | 8/1988 | Fukahori et al. |

(Continued)

FOREIGN PATENT DOCUMENTS

| JP | 5-133137 | 5/1993 |
| JP | 10-220062 | 8/1998 |

(Continued)

*Primary Examiner* — Mark Wendell
(74) *Attorney, Agent, or Firm* — McMillan LLP

(57) ABSTRACT

A building structure including a plurality of vertical elements extending from a ground surface with at least a first of the vertical elements connected to a second of the vertical elements by a coupling member, the coupling member includes a damping element for damping vibrations in the building structure resulting from relative movement between the first and second vertical elements due to lateral loads applied to the building structure. The damping element undergoes deformation due to the relative movement between the vertical elements causing the damping material to be activated in shear. At least one of a first and second fuse member is connected to at least one of first and second ends of the damping element respectively. The fuse member is selected from a material, and otherwise sized and dimensioned to exhibit semi-rigid behavior when the damping element undergoes deformation due to loads below a predetermined load limit and to undergo deformation without substantially increasing the load in the fuse and in the damping element when loads exceed the predetermined load limit, such that the damping element is prevented from deforming beyond its predetermined deformation limit and therefore avoiding any occurrence of damage that would reduce its ability to provide damping to the structure. First and second connecting means are also provided for rigidly connecting the first and second fuse members to the first and second vertical elements, respectively.

24 Claims, 21 Drawing Sheets

(56) References Cited

U.S. PATENT DOCUMENTS

| | | | |
|---|---|---|---|
| 5,271,197 A | 12/1993 | Uno et al. | |
| 5,491,944 A | 2/1996 | Mors et al. | |
| 5,842,312 A | 12/1998 | Krumme et al. | |
| 5,946,866 A * | 9/1999 | Weglewski et al. | 52/167.1 |
| 6,141,919 A * | 11/2000 | Robinson | 52/167.7 |
| 6,233,884 B1 | 5/2001 | Tipping et al. | |
| 6,457,284 B1 | 10/2002 | Isoda | |
| 6,840,017 B1 * | 1/2005 | Shimoda et al. | 52/167.1 |
| 7,076,926 B2 * | 7/2006 | Kasai et al. | 52/167.8 |
| 7,174,680 B2 | 2/2007 | Smelser | |
| 7,712,266 B2 | 5/2010 | Sarkisian | |
| 7,987,639 B2 * | 8/2011 | Christopoulos et al. | 52/167.3 |
| 8,250,818 B2 * | 8/2012 | Tremblay et al. | 52/167.3 |
| 8,516,753 B2 * | 8/2013 | Christopoulos et al. | 52/167.3 |
| 8,683,758 B2 * | 4/2014 | Christopoulos et al. | 52/167.3 |
| 8,701,359 B2 * | 4/2014 | Packer et al. | 52/167.3 |
| 2008/0016794 A1 | 1/2008 | Tremblay et al. | |

FOREIGN PATENT DOCUMENTS

| | | |
|---|---|---|
| JP | 2002-194917 | 10/2002 |
| JP | 2004-197402 | 7/2004 |

* cited by examiner

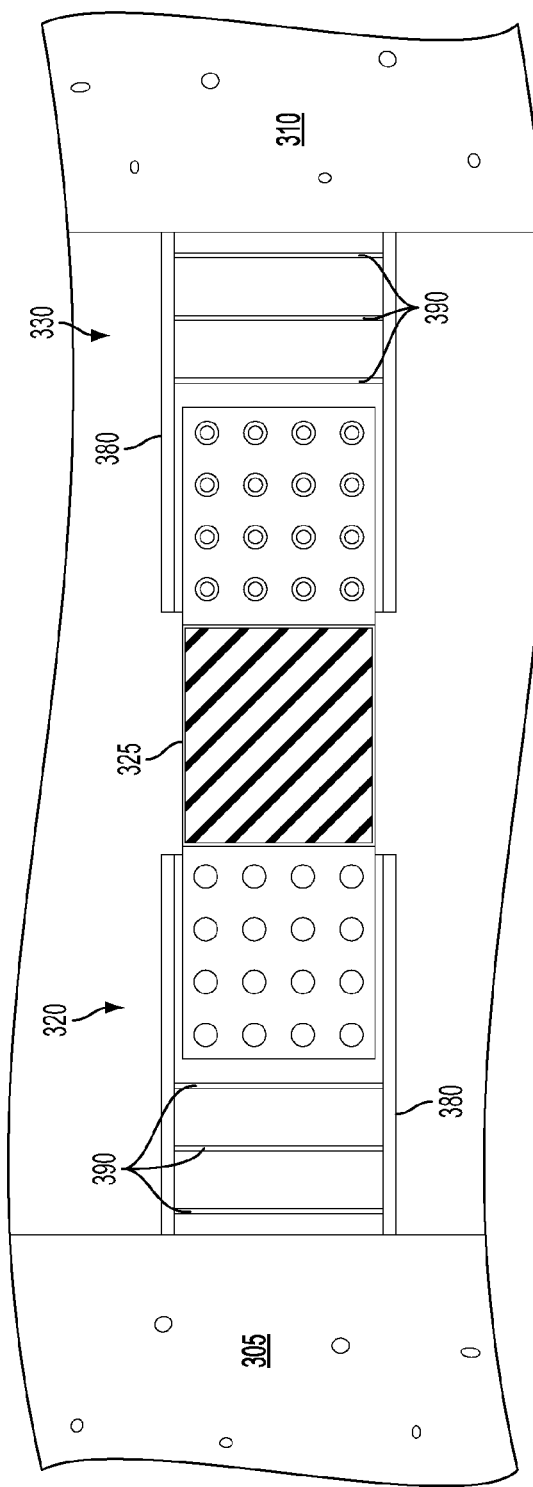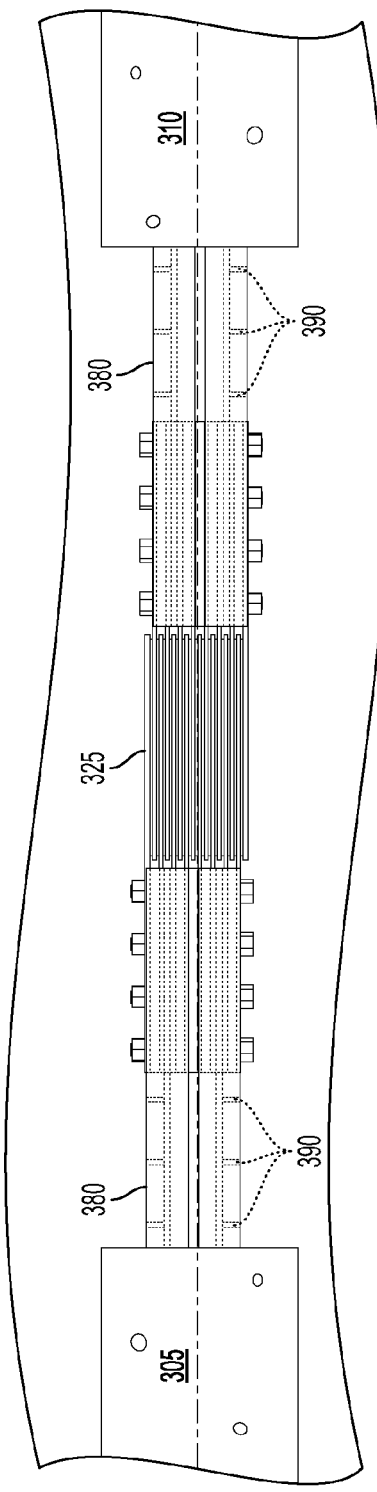
FIG. 3A
FIG. 3B

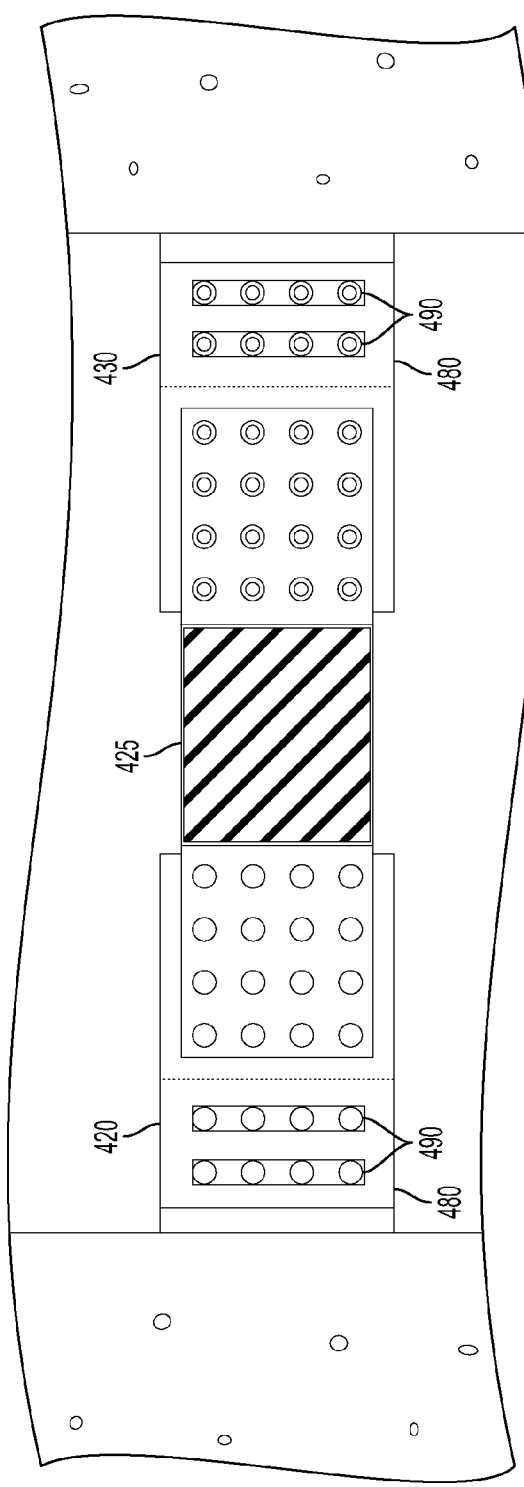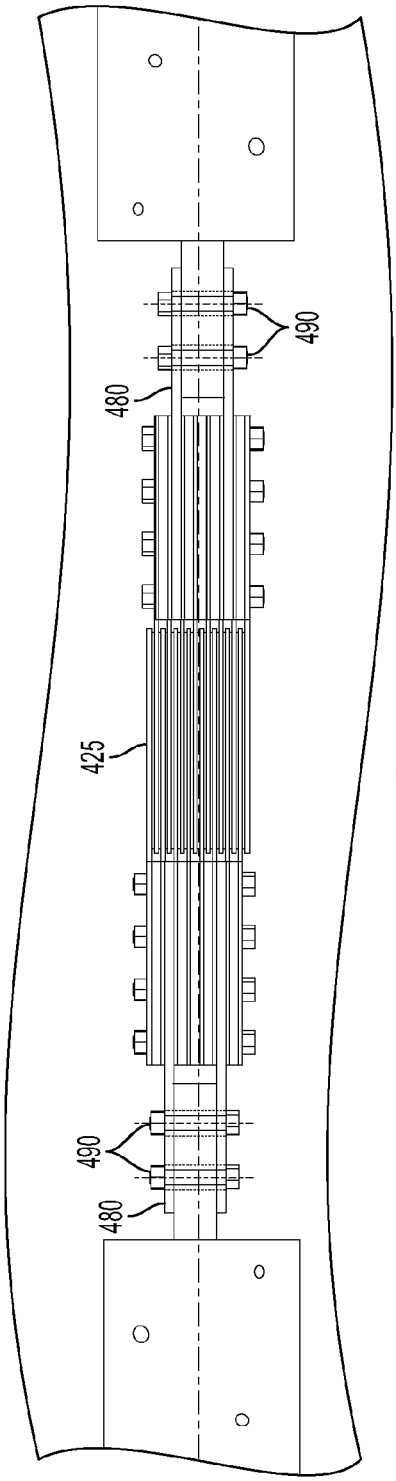

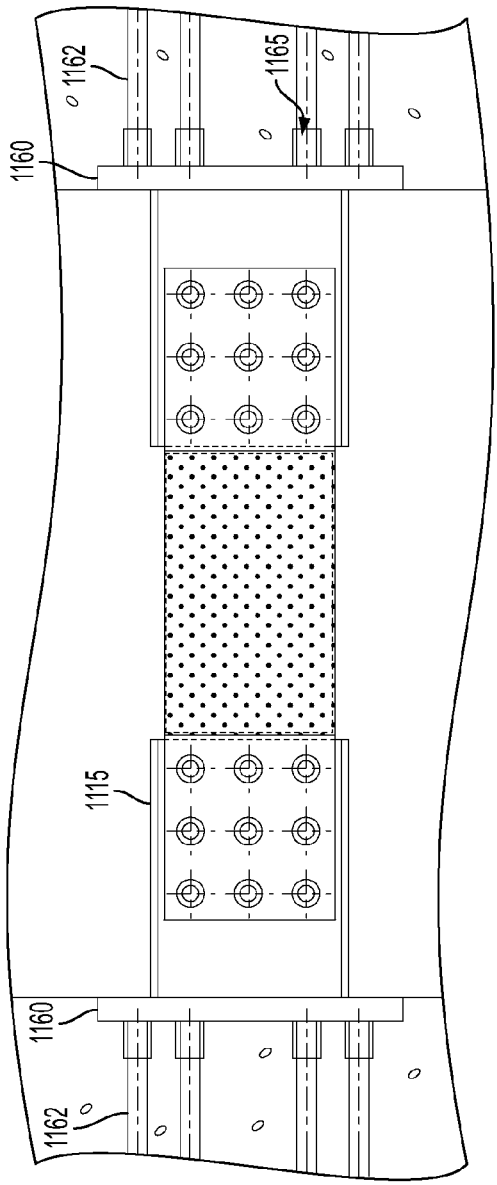
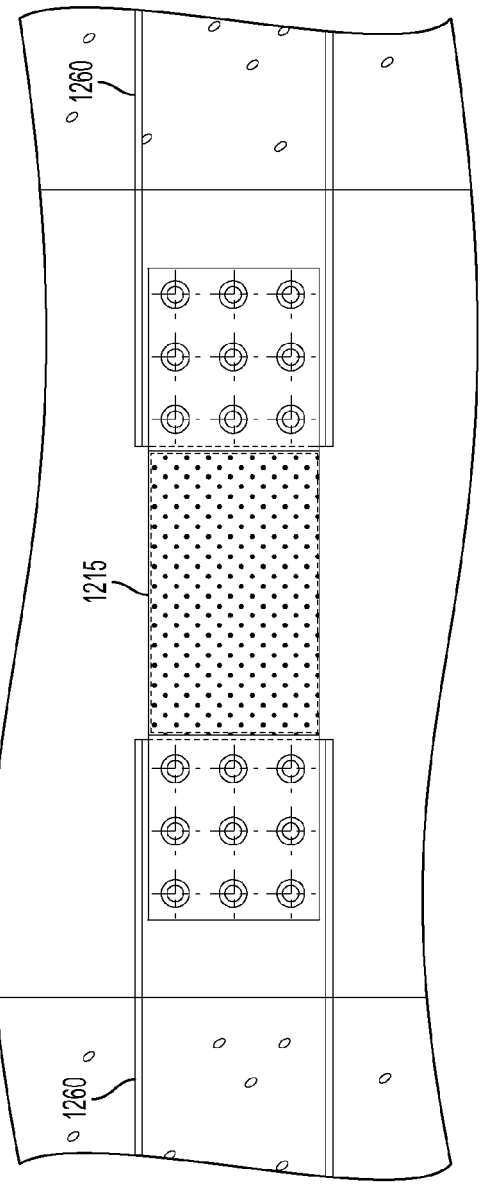
FIG. 11
FIG. 12

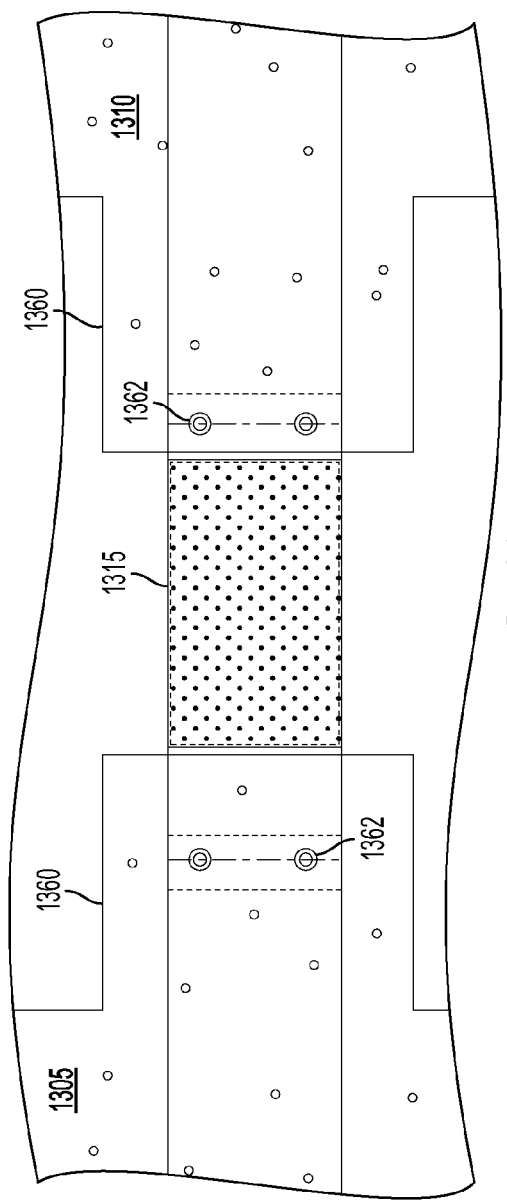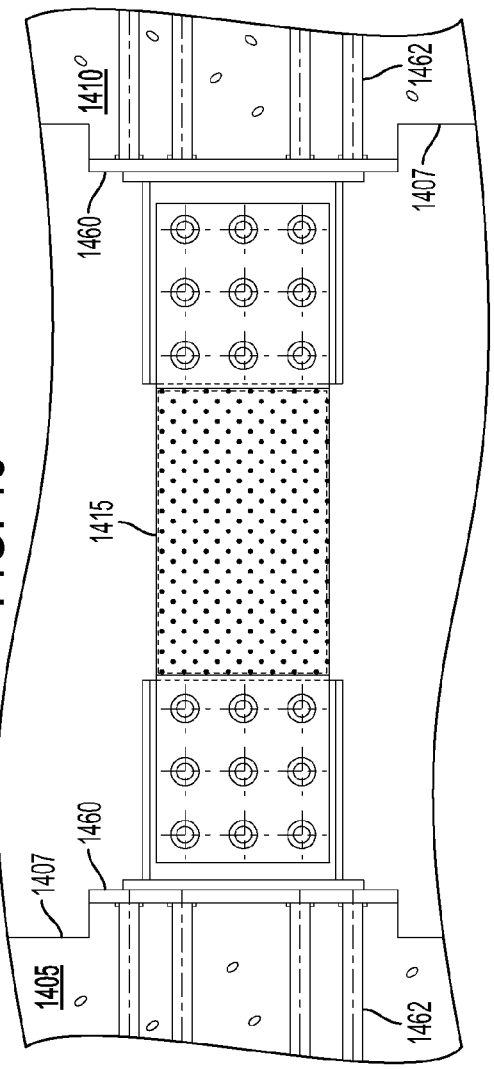

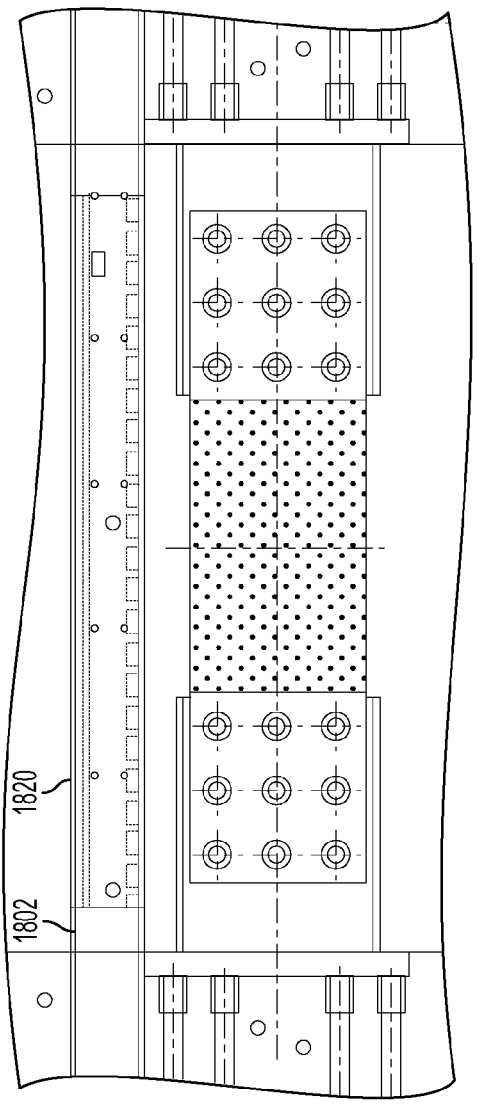
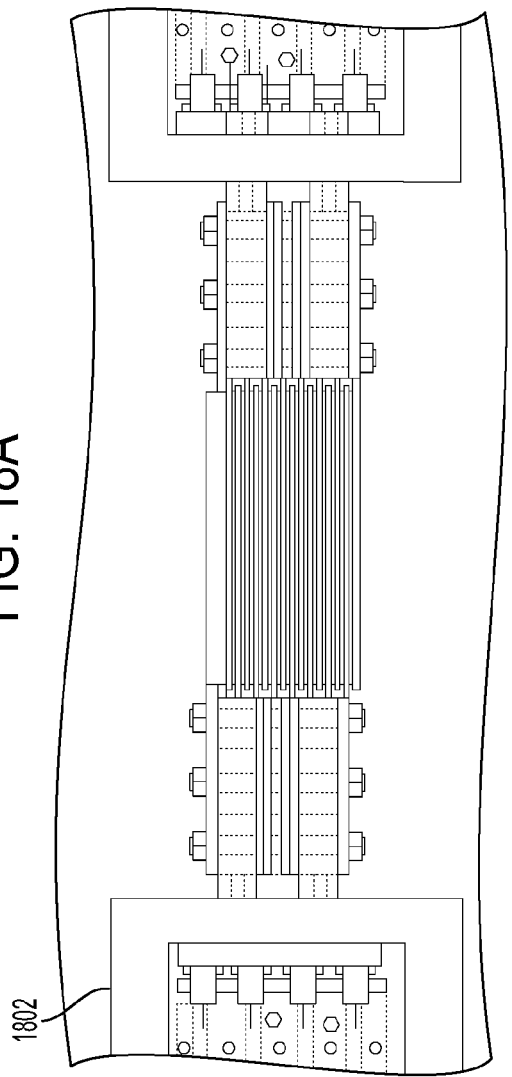
FIG. 18A
FIG. 18B

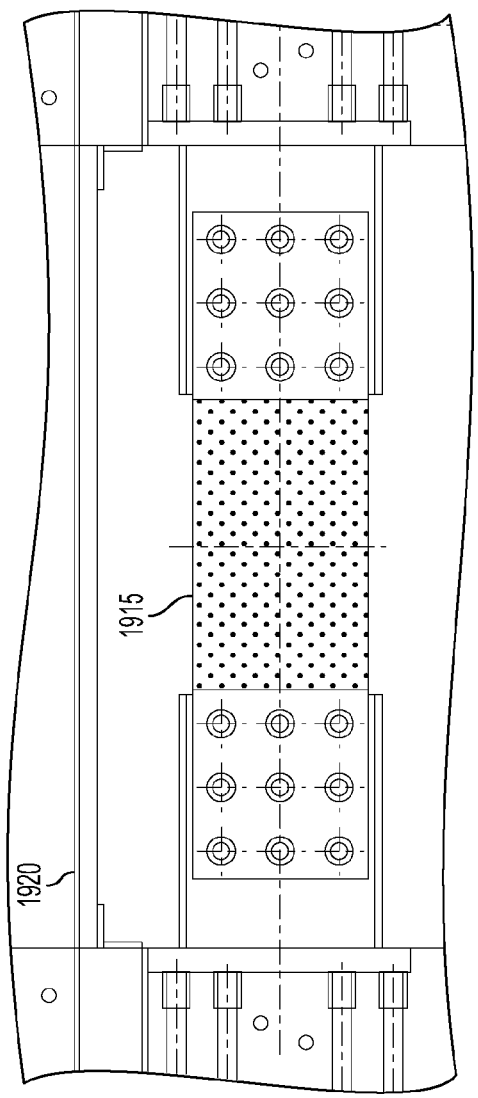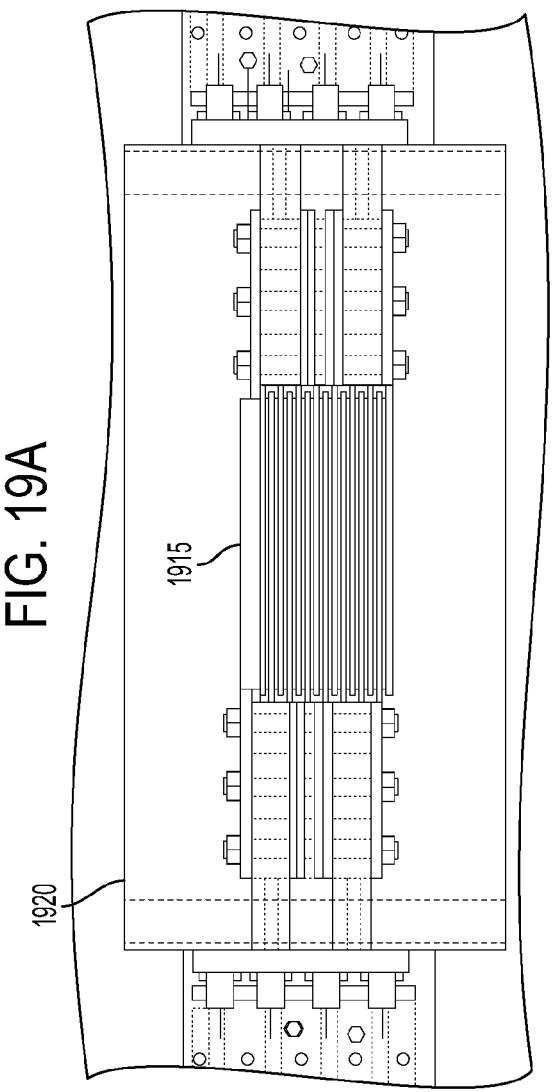

COUPLING MEMBER FOR DAMPING VIBRATIONS IN BUILDING STRUCTURES

This application claims priority from U.S. Provisional Application No. 61/432,631, filed on Jan. 14, 2011, the contents of both of which, in their entirety, are herein incorporated by reference.

FIELD OF THE INVENTION

The present invention relates generally to the field of building structures, and more specifically to vibration damping mechanisms for use in building structures.

BACKGROUND OF THE INVENTION

Modern buildings, using typical construction components such as reinforced concrete shear walls, structural steel braced frames, structural steel or reinforced concrete moment frames or combinations thereof, have low inherent damping properties which decrease with building height. Due to this low inherent damping, high-rise buildings, in particular, tend to be susceptible to excessive vibrations caused by dynamic loads. Excessive accelerations and torsional velocities can cause occupant discomfort, while excessive displacements can cause damage to non-structural and structural elements. For this reason it is advantageous to provide additional sources of damping to control these excessive vibrations and reduce the overall building response to dynamic loads. These dynamic loads can include both those resulting from wind loads and earthquake loads.

Currently available systems for controlling displacements, velocities and accelerations in such structures consist of passive systems such as supplemental dampers and vibration absorbers as well as active systems.

Passive supplemental dampers such as hysteretic, viscous and visco-elastic dampers are currently used in typical braced configurations and are activated under axial deformations. While this may be effective in adding damping to some structural configurations, where under this typical braced configuration the brace elements undergo significant axial deformations, they are less effective for other structural systems, such as structural systems commonly used in high rise buildings where the primary mode of lateral deformation does not cause sufficient axial deformation in typical bracing elements to effectively activate such dampers. In order to increase the deformations to an extent sufficient to activate the dampers, special configurations using toggle bracers or scissor braces to amplify the displacements have been used.

Vibration absorbers such as Tuned Mass Dampers (TMD) and Tuned Liquid Dampers (TLD) are also used to reduce the deflections, velocities and accelerations of such structures during wind loading. They typically consist of a mechanical vibrating system inserted on the top floor of buildings in order to maximize their effectiveness. This has the disadvantage of using up some of the most valuable real estate within the building in addition to being expensive to design and to build. They also act in a limited frequency range as they must be tuned to a single mode of vibration.

Active systems require an external power source, an actuating force and extensive hardware and software control systems. As a result, they are expensive to design and implement, and are susceptible to power outages or failure of the control system.

One solution to the above-identified problems with existing systems was proposed in PCT Application No. PCT/CA2006/000985 filed Jun. 16, 2006, entitled "Fork Configuration Dampers and Method of Using Same." The system in that application presents a configuration for damping systems in buildings for interconnecting two elements of a structure that undergo relative movement with respect to each other. The damping system of the '985 application discloses a first set of plates fixed to a first generally vertically extending structural element provided for resisting lateral loads and a second set of plates fixed to a second generally vertically extending structural element provided for resisting lateral loads. The vertically extending structural elements may, for example, be walls, columns, frames or other vertical elements in a building. The first and second sets of plates each comprise a plurality of substantially parallel, spaced apart plate elements arranged such that the plate elements of the first set of plates are interdigitated with the plate elements of the second set of plates. A damping material is provided to couple the first set of plates to the second set of plates. In this manner, as the vertically extending structural elements undergo relative movement with respect to each other due to the application of lateral loads to the building, the first and second set of plates are displaced in a vertical shear movement and act to damp vibrations in the structure via the energy dissipating material resisting the displacement of the plates with respect to each other.

While this system provides significant improvement to prior damping systems, in the event of extreme wind loading and/or earthquake loading, deformations placed on the damping system may overload the system, causing an undesirable failure which may render the damper ineffective for subsequent cycles of loading. Accordingly, in the event of these extreme loading conditions which exceed the intended deformation state of the damping systems, a more ductile robust response would be advantageous. In addition following an extreme event it is difficult to repair or replace the damping system.

SUMMARY OF THE INVENTION

According to one embodiment of the invention, there is provided a building structure including a plurality of vertical elements extending from a ground surface with at least a first of the vertical elements connected to a second of the vertical elements by a coupling member, the coupling member includes a damping element for damping vibrations in the building structure resulting from relative movement between the first and second vertical elements due to lateral loads applied to the building structure. Preferably, first and second set of plates in the damping element are displaced in a vertical shear movement and act to damp vibrations in the structure via energy dissipating material resisting the displacement of the plates with respect to each other. At least one of a first and second fuse member is connected to at least one of first and second ends of the damping element respectively. The fuse member is selected from a material, and otherwise sized and dimensioned to exhibit semi-rigid behavior when the damping element undergoes deformation due to loads below a predetermined load limit and to undergo deformation when loads exceed the predetermined load limit, such that the damping element is prevented from deforming above its predefined deformation limit. First and second connecting means are also provided for rigidly connecting the first and second fuse members to the first and second vertical elements, respectively. These lateral loads result in shear loads in the damping system. Accordingly, the fuse member is designed such that the fuse is activated when a predetermined shear load in the damping element is reached.

According to one aspect of this embodiment, the damping element includes first and second sets of two or more plates each, wherein the plates in the first set are interdigitated with the plates in the second, and spaced from each other in a direction substantially parallel to the ground surface, and a damping material disposed between each plate in the sets of plates.

According to another aspect of this embodiment, the damping material includes a viscoelastic material; the damping element damps out the vibrations as the damping element undergoes shear deformation as each plate in the set of plates is displaced in a vertical direction under resistance of the damping material.

According to another aspect of this embodiment, the predetermined load limit is selected at a load limit below which a damage incident occurs; wherein a damage incident is selected from the group comprising a ripping of the damping material, debonding of damping material from a plate in the sets of plates, failure of a plate in the sets of plates, failure of a means for connecting the sets of plates, failure of a weld, failure of the connecting means and combination of same. Other failure modes are also contemplated, including failure of the elements to which the damping system is connected to or the vertical structural elements to which the damping element is connected.

According to another aspect of this embodiment, at least one or both of the fuse members includes a beam portion.

According to another aspect of this embodiment, at least one or both of the fuse members includes a beam portion and a stiffener portion functionally connected to the beam portion, wherein the stiffener portion is adapted to stabilize the beam portion when the loads exceed the predetermined load limit According to another aspect of this embodiment, the beam portion includes a reduced beam section.

According to another aspect of this embodiment, the stiffener portion includes a reinforcing member connected to the beam portion and arranged in parallel with the ground to stabilize the beam portion against flexural forces in the beam portion.

According to another aspect of this embodiment, the stiffener portion includes at least one reinforcing member connected to the beam portion and arranged in parallel with the vertical elements to stabilize the beam portion against shear forces in the beam portion.

According to another aspect of this embodiment, at least one of the first and second connecting means includes an end-plate adapted to be connected to a plate anchored to the vertical elements.

According to another aspect of this embodiment, the end-plate is connected to the plate by removable and replaceable fasteners.

According to another aspect of this embodiment, there is provided a slab member attached to each of the first and second vertical elements, and spaced in a vertical direction from the coupling member.

According to another aspect of this embodiment, there is provided one or more static stiffness increasing structural members attached to a top surface of the damping element.

According to another aspect of this embodiment, the static stiffness increasing structural member includes a steel plate.

According to another embodiment of the invention, there is provided a method for damping vibrations caused by lateral loads being applied to a building structure including providing a damping element for damping vibrations in the building structure resulting from relative movement between the first and second vertical elements due to lateral loads applied to the building structure, the damping is caused by energy dissipating material being deformed by the first set of steel plates undergoing deformation relative to the second set of steel plates; providing at least one fuse member is connected to at least one of first and second ends of the damping element respectively; the fuse member selected from a material, and otherwise sized and dimensioned to exhibit semi-rigid behavior when the damping element undergoes deformation due to loads below a predetermined load limit and to undergo deformation when loads exceed the predetermined load limit, such that the damping element is prevented from deforming above its predefined deformation limit; and, rigidly connecting the first and second fuse members to the first and second vertical elements. These lateral loads result in shear loads in the damping system. Accordingly, the fuse member is designed such that the fuse is activated when a predetermined shear load in the damping element is reached.

According to one aspect of this embodiment, the damping element includes a set of two or more plates spaced from each other in a direction substantially parallel to a ground surface, and a damping material disposed between each plate in the set of plates.

According to another aspect of this embodiment, the damping material includes a viscoelastic material; the damping element damps out the vibrations as the damping element undergoes shear deformation as each plate in the set of plates is displaced in a vertical direction under resistance of the damping material.

According to another aspect of this embodiment, at least one or both of the fuse members includes a beam portion.

According to another aspect of this embodiment, at least one or both of the fuse members includes a beam portion and a stiffener portion functionally connected to the beam portion, wherein the fuse portion is adapted to activate when the damping element reaches the predetermined load limit, and wherein the beam portion is adapted to undergo deformation when the damping element reaches the predetermined load limit.

According to another aspect of this embodiment, the beam portion includes a reduced beam section.

According to another aspect of this embodiment, the stiffener portion includes a reinforcing member connected to the beam portion and arranged in parallel with the ground.

According to another aspect of this embodiment, the stiffener portion includes at least one reinforcing member connected to the beam portion and arranged in parallel with the vertical elements.

BRIEF DESCRIPTION OF THE DRAWINGS

Embodiments will now be described, by way of example only, with reference to the attached Figures, wherein:

FIGS. 3A and 3B are front and bottom views, respectively showing a coupling member according to another embodiment of the invention.

FIGS. 4A and 4B are front and bottom views, respectively showing a coupling member according to another embodiment of the invention.

FIG. 11 illustrates an alternate means for connecting various embodiments of FIGS. 2 to 7 to verticals in a building structure.

FIG. 12 illustrates an alternate means for connecting various embodiments of FIGS. 2 to 7 to verticals in a building structure.

FIG. 13 illustrates an alternate means for connecting various embodiments of FIGS. 2 to 7 to verticals in a building structure.

FIG. 14 illustrates an alternate means for connecting various embodiments of FIGS. 2 to 7 to verticals in a building structure.

FIGS. 18A and 18B are front and bottom views, respectively of a slab and flexible membrane in combination with the coupling member of the invention.

FIGS. 19A and 19B are front and bottom views, respectively of a drop panel slab in combination with the coupling member of the invention.

FIGS. 20A and 20B to 23A and 23B illustrate various test results as per the Example set forth following the description of the preferred embodiments.

DETAILED DESCRIPTION

Figure 1:
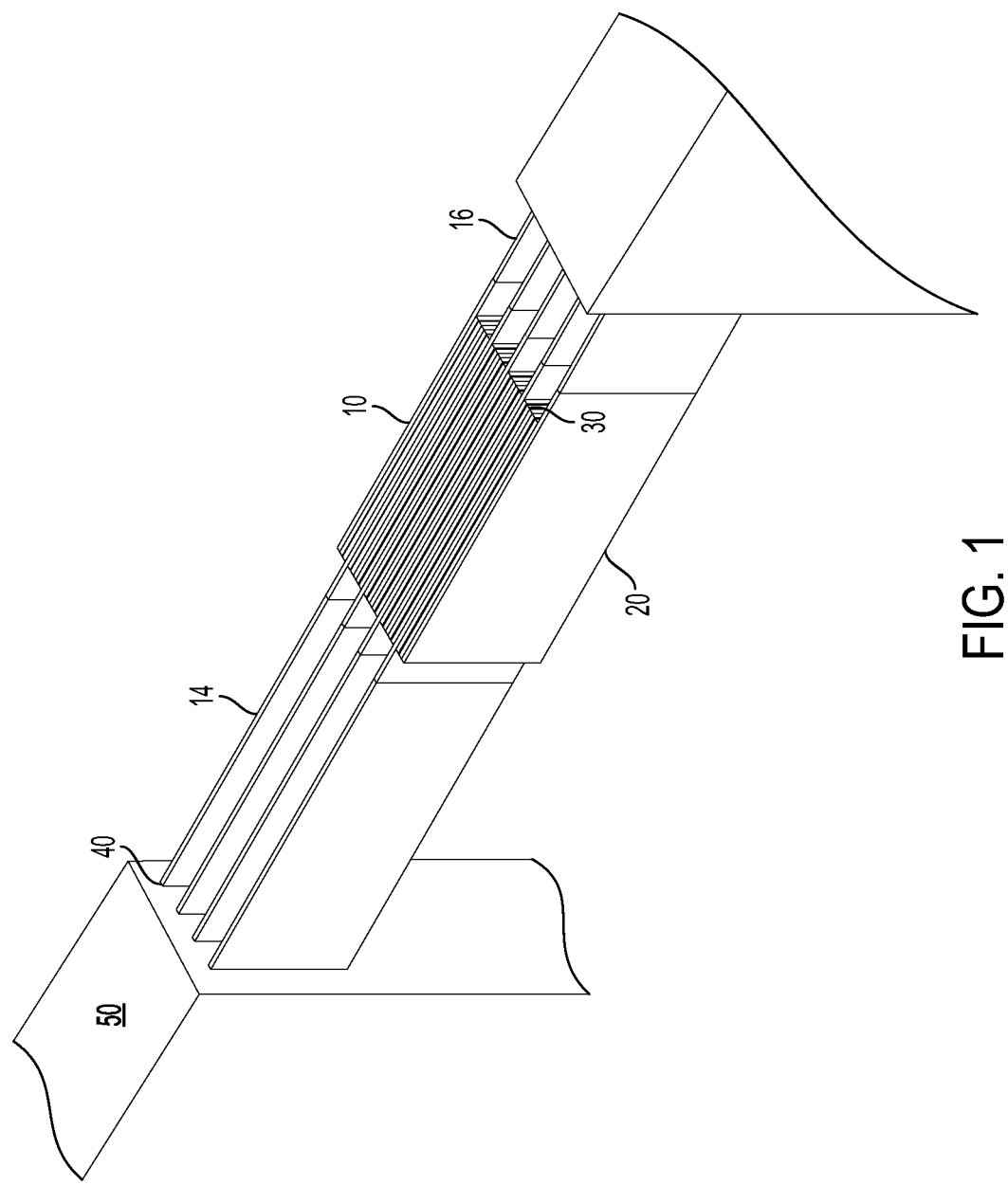
FIG. 1 is a perspective view of a prior art damping element for use in building structures.

In applicant's prior PCT Application No. PCT/CA2006/000985 filed Jun. 16, 2006, entitled "Fork Configuration Dampers and Method of Using Same.", the contents of which are herein incorporated by reference, there was disclosed a damping system for use in building structures that included a damping element as shown in FIG. 1. As illustrated, the damping element 10 includes two sets 14, 16 of two or more plates 20 spaced from each other in a direction substantially parallel to a ground surface, and a damping material 30 disposed between each plate 20 in the sets of plates. In practice, the set of plates are interdigitated with each other, and have ends 40 rigidly connected to vertical elements 50 in the building structure. The vertical elements 50 resist lateral loads applied to the building structure, and move relative to each other when significant loads are applied. The plates 20, and the damping material 30, disposed therebetween undergo shear deformation as the vertical elements 50 move with respect to each other, and accordingly, by virtue of the damping material, provides damping in the building structure as the steel plates 20 move relative to each other. The damping material is preferably a viscoelastic material. The improvements described in this application are preferably applied to the system described in the aforementioned PCT International patent application, but may also be applied to other damping systems used in building structures, and particularly tall building structures where vibrations caused by lateral loads being applied to the building structure of concern.

Embodiments of the invention relate particularly to improvements upon systems acting to damp vibrations in building structures, and particularly to systems providing damping for vibrations caused by lateral loads applied to a building structure and resisted by the vertical elements. Furthermore, the embodiments herein described are particularly applicable to damping systems that include failsafe mechanisms for extreme loading conditions that would, in the absence of elements disclosed herein below, result in significant damage to the damping system, for example, during earthquake loading. The various embodiments of the invention, as will be described in detail below provide solutions to making dampening systems in building structures more robust, more easily repairable and replaceable, and to limit the damping element from reaching its damage incidence and to therefore be permanently damaged in the event of severe vibrations or catastrophic loading events, such as earthquakes. Various other benefits and advantages of the invention herein described will also be outlined below and become apparent to a person skilled in the art. In particular, the invention provides for one or more fuse members connected to the damping element. The fuse member, as described in more detail below, is designed, sized and otherwise dimensioned to exhibit semi-rigid behavior when the damping element undergoes deformation due to lateral loads below a predetermined load limit and to undergo deformation without a substantial increase in the loads carried by the fuse and the damping elements when lateral loads exceed said predetermined load limit, such that said damping element is prevented from deforming beyond their predefined deformation limit. In this description, reference is made to the fuse being activated when the lateral loads exceed the predetermined load limit in this context.

The predetermined load limit is preferably selected at a load limit below which a damage incident occurs. In practice, lateral loads applied to the building structure are resisted by the vertical elements. These lateral loads result in deformations, particularly shear deformations in the damping system acting as a coupling member between the vertical elements. At a given loading of the damping system, the shear, or other, deformation in the damping system results in a damage incident occurring. For the purposes of this application, a damage incident is defined as one that would cause permanent, near permanent, or similar damage that cannot be repaired in situ to the damping element or renders the damping system inefficient in providing damping to the structure. Preferably, the damage incident is one or more of ripping of the damping material, debonding of damping material from a plate to which the damping material is connected, failure of a plate forming part of the damping element, failure of a means for connecting elements in the damping element, failure of a weld connecting the damping element or the column element, and failure of a connecting means for the coupling member, or and combination of same. Other damage incidents or failure modes are also contemplated, including but not limited to, failure of vertical elements to which the dampers are attached.

Accordingly, the fuse member as herein described undergoes deformation after a predetermined activation load is reached, without any substantial increase in the load carried by the fuse member and/or by the damping element to thereby protect the coupling member from all expected damage incidents.

In order to implement a fuse member as herein described, applicants provide one or more a beam members connected in parallel which, in combination, exhibit semi-rigid behavior when loaded at levels below the predetermined load limit. Optionally, the beam members further include a stiffener for stabilizing the beam members during elevated loading conditions. Having thus described in general terms the operating principles of the invention, various particular embodiments of putting the invention into practice will now be described.

Figure 2A:
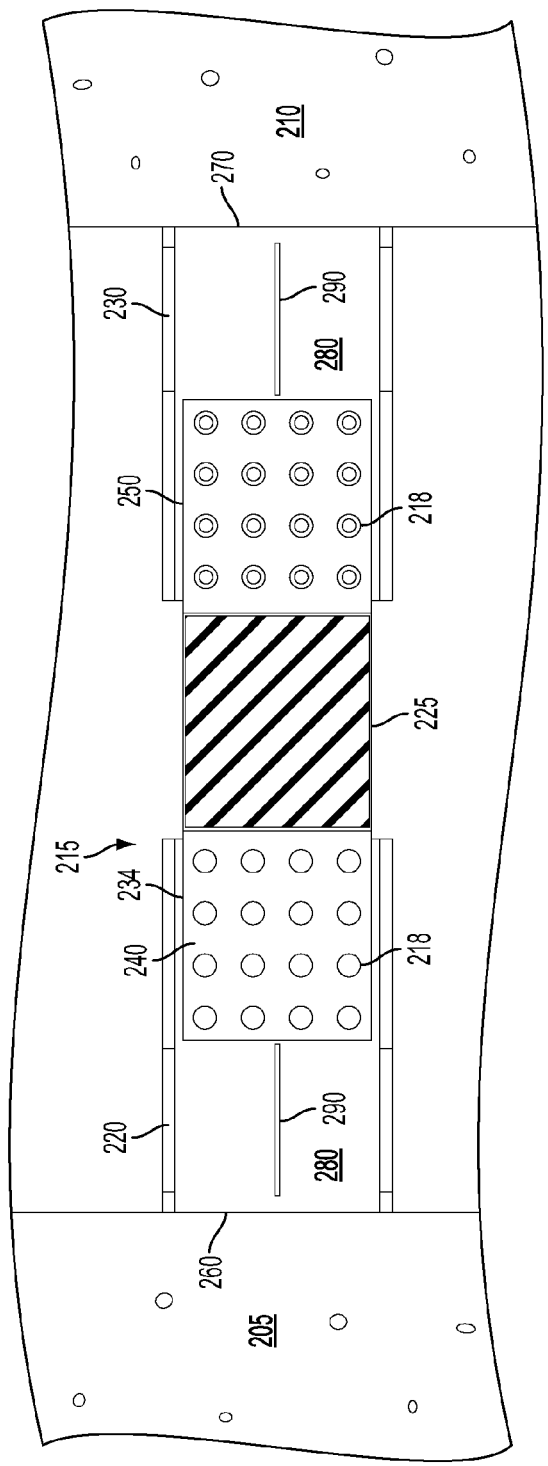
FIGS. 2A and 2B are front and bottom views, respectively showing a coupling member according to one embodiment of the invention.
Figure 2B:
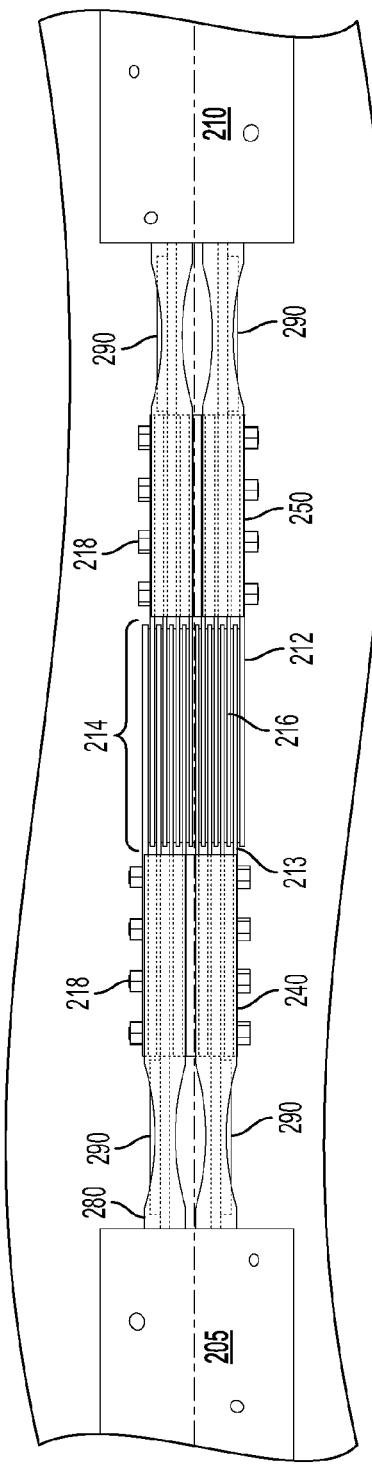
Figure 2C:
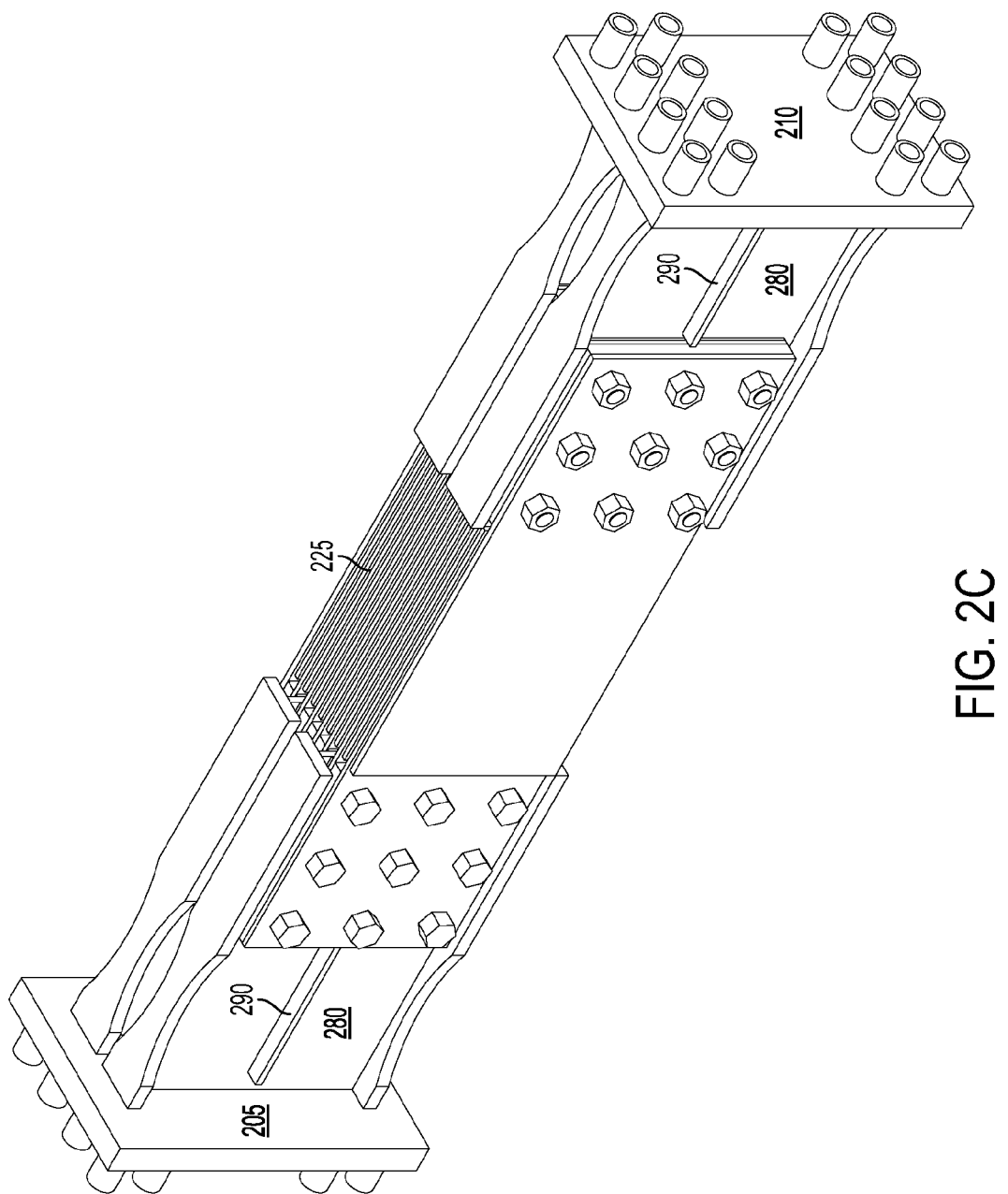
FIG. 2C is a perspective view of the coupling element of FIGS. 2A and 2B.

Referring now to FIGS. 2A, 2B and 2C, there is shown one embodiment of the invention where there is shown a cross-section of first 205 and second 210 vertical elements that are two of a plurality of vertical elements extending vertically from a ground surface (not shown). For the purposes of this application, it will be understood that the terms vertical and vertically are used in their ordinary sense with respect to building structures, and that is, in a direction generally perpendicular to the ground surface. In addition, the term horizontally, when used, refers to a direction that is generally parallel to the ground surface. A coupling member 215 connects the first vertical element 205 with the second vertical element 210. The coupling member 215 as herein disclosed is operable to replace or be used in lieu of rigid coupling members traditionally used in building structures.

Coupling member 215 preferably includes a damping element 225 for damping vibrations in the building structure resulting from relative movement between the first 205 and second 210 vertical elements due to lateral loads being applied to the building structure. An exemplary embodiment of a damping element 225 according to the invention is described further below. Regardless of the particular implementation of the damping element, the damping element will have a damage incidence limit determined according to design constraints and loads typically expected during operation that result in deformation of the damping element due to relative movement between the vertical elements 205 and 210. Once the load level in the damping element reaches a predetermined limit, due to elevated loads being applied to the building structure, the damping element will, in the absence of the fuse members according to the invention, as described below, become permanently deformed, damaged, or others rendered unsuitable for use. This would render the damping element ineffective for subsequent loading cycles.

In order to address this issue, applicants further provide a first fuse member 220 and a second fuse member 230 connected to a first end 240 and a second end 250 of the damping element 225, respectively. The fuse members 220, 230 are selected from a material, and otherwise sized and otherwise dimensioned to exhibit semi-rigid behavior when the damping element 225 undergoes deformation due to loads below a predetermined load limit and to activate and therefore undergo deformation when loads reach the predetermined load limit without any substantial increase in the load carried by the fuse and by the damping element, 225 thereby preventing the damping element 225 from deforming due to loads above the predetermined load limit. As described above, the predetermined load limit is one at which a damage incident occurs that would render the damping element 225 unsuitable for continued use, based on any number of factors.

A first connecting member 260 is provided to connect the first fuse member 220 to the first vertical element 205, and similarly, a second connecting member 270 is provided to connect the second fuse member 230 to the second vertical element 210. The connecting members 260, 270 preferably provide a semi-rigid connection with the vertical elements 205, 210, such that possible movement caused by any bending moments at the connecting members 260, 270 is fully constrained, prior to activation of the fuse.

The fuse members 220, 230 preferably include a beam portion 280 and optionally, a stiffener portion 290. Stiffener portion 290 is designed, sized and otherwise dimensioned to be functionally connected to the beam portion 280, and to provide stabilizing support to the beam portion 280, when the loads applied to the vertical elements reach the predetermined loads. Accordingly, when the fuse members 220, 230 have been activated, the stiffener portion 290 acts to provide additional deformation capacity to the fuse members 220, 230 themselves. This occurs without any substantial increase in the loads carried by the fuse and the damping element.

In the illustrated embodiment, the stiffener portion 290 may be reinforcing member 290 that is connected to the beam portion 280, and arranged in parallel with the ground such that the stiffener portion 290 provides stability against the beam portion 280 buckling while it is yielding in flexure when the applied lateral loads reach and/or exceed the predetermined load. For clarity, where reference is made throughout the description and claims of the applied loads reaching the predetermined load, the predetermined load is one at which loads below this value do not result in a damage incident to the damping element or connections related thereto that would render the damping element unsuitable for use. The types of damages contemplated are discussed above, but are not limited to same.

The damping element 225 preferably includes two sets of plates 212, 213 having at least two, and more preferably, a plurality of plates spaced apart in the horizontal direction. The sets of plates 212, 213 are interdigitated, and have an overlapping region 214 where a portion of half of the plates in the set overlaps. In this overlapping region 214, there is provided a damping material 216, preferably a viscoelastic material, that is fixed to each plate on either side of the plates, as illustrated. On either side of the overlapping region 214, are connection means 218 that hold the set of plates together, and the damping material 216 in compression at the overlapping region 214. As illustrated, connection means 218 are preferably bolts.

Figure 2D:
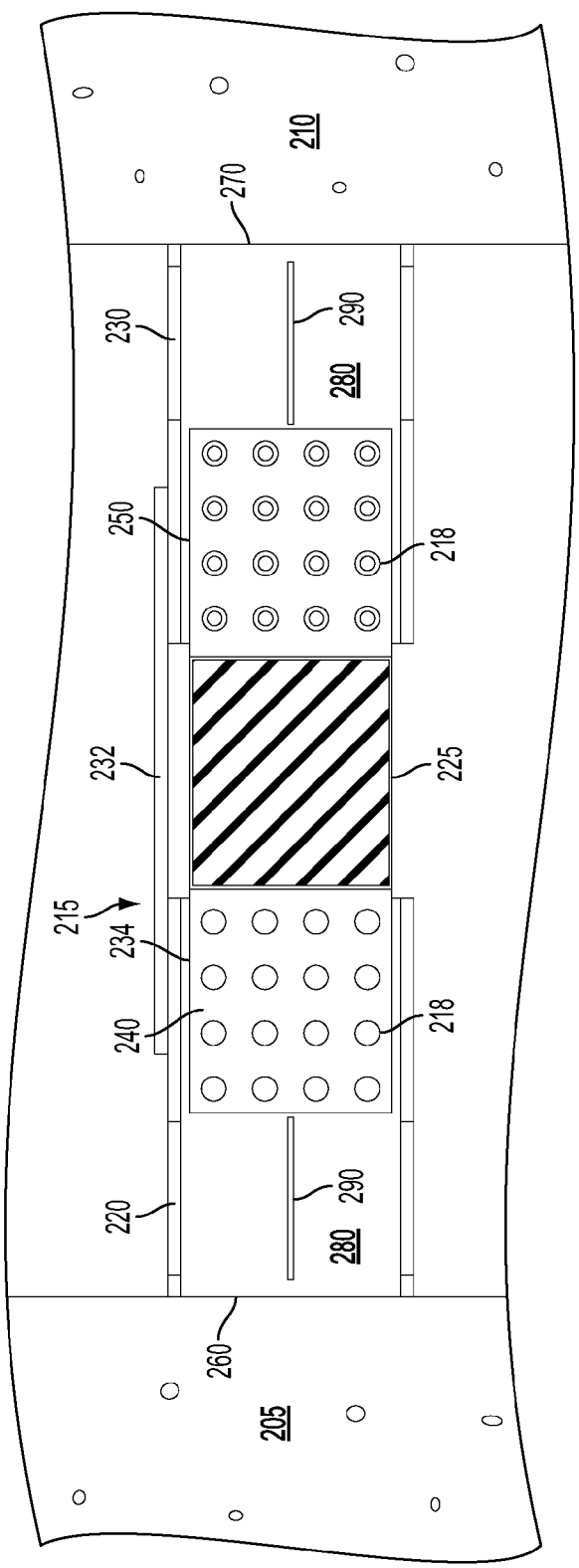
FIG. 2D is a front view of the coupling member of FIGS. 2A and 2B including an optional static stiffness increasing member.

As shown in FIG. 2D, an optional static stiffness increasing member 232 may be attached to a top surface 234 of the sets of plates 212, 213. In a preferred embodiment, the stiffness increasing member 232 is a plate, and preferably a steel plate. Other static stiffness increasing members 232 are also contemplated, including but not limited to, angle sections, "u" sections and other members that are able to perform the desired function as described. In operation, the plate member 232 serves to increase the static stiffness of the damping element 215. In the preferred embodiment, the plate 232 adds to the static stiffness of the damper such that under static lateral loads caused by wind pressure on the building which are also applied in combination with dynamic lateral loads the structure is stiffer and sustains less deformation.

The static stiffness increasing member 232, in any of its structural forms herein described, may be connected to the top and/or the bottom of the coupling member. One side of the member 232 is preferably connected to one of the connecting elements and the other side of the structural element is connected to other connecting element. For clarity, the member 232 is not connected to the sets of plates 212, 213 that are bonded to the viscoelastic material. In another embodiment of the same, the member 232 may be directly embedded into the vertical elements or walls, a small distance above and below, respectively but are not connected to the damper element. In operation, this also increases the coupling effect under static loads. In addition, the increase of the overall stiffness of the structure caused by the installation of the static stiffness increasing member 232 also reduces the vibrational period of the structure as a whole, which in turn reduces the dynamic effects of the wind loading on the structure.

Referring now to FIG. 8, the behavior of the coupling member 215 according to the invention is illustrated in an exaggerated fashion, where the damping element 225 has been displaced. As shown, the damping element 225 has reached its damage incident limit, and accordingly the fuse has yielded. The fuses 280 and 290 now undergoes deformation to prevent the damping element 225 from deforming any further. In the exaggerated view shown, the plates in the set of plates 212 on either side of the damping material have been displaced to a maximum amount in the vertical direction.

Various other implementations of a fuse member will now be described. Elements corresponding directly to those that have been described and illustrated with respect to FIG. 2 are numbered correspondingly in the hundreds for the respective figure number, but are not described in further detail, except insofar as it is necessary for describing particular aspects, variations or embodiments of the invention.

Referring now to FIG. 3, there is shown fuse members 320 and 330 made up of beam portion 380 and stiffener portion 390. In this embodiment, stiffener portion 390 is at least one, and preferably a plurality of, reinforcing members 390 connected to the web and between the flanges of the fuse, and arranged in parallel with the vertical elements 305, 310 such that the stiffener portion 390 provides stability against buckling in the fuse element when the applied lateral loads exceed the predetermined load Referring now to FIG. 4, there are shown fuse members 420 and 430. The fuse members 420 and 430 are made up of semi rigid plates 480, clamped (or otherwise attached) to plates extending from the sets of plates in the damper by connecting means 490. As illustrated, the connecting means 490 are bolts that prevent slippage of the plates with respect to the semi-rigid plates 480. When the predetermined friction force limit is reached, the plates slip, and the semi-rigid plates move relative to another. Accordingly, the fuse in this embodiment is activated by slippage of the bolted connection, and therefore, the bolted connection itself forms the fuse mechanism in this embodiment. Horizontal or rotational movement in the bolts may be accommodated through the connection by an inclined connection portion.

Figure 5A:
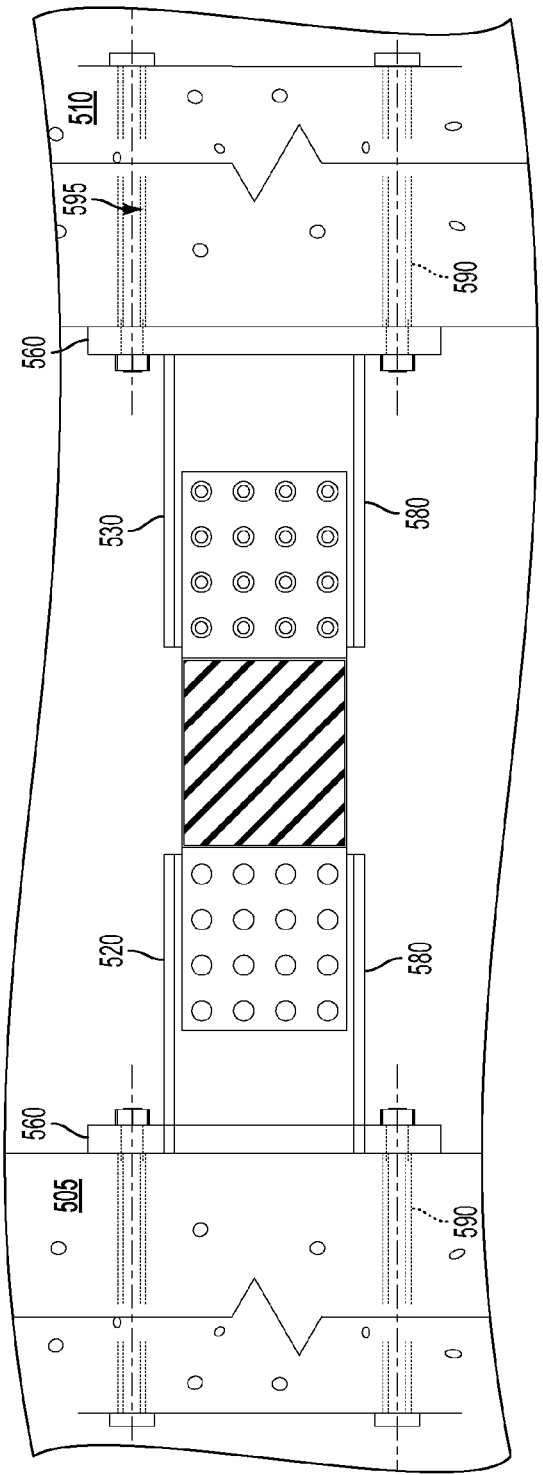
FIGS. 5A and 5B are front and bottom views, respectively showing a coupling member according to another embodiment of the invention.
Figure 5B:
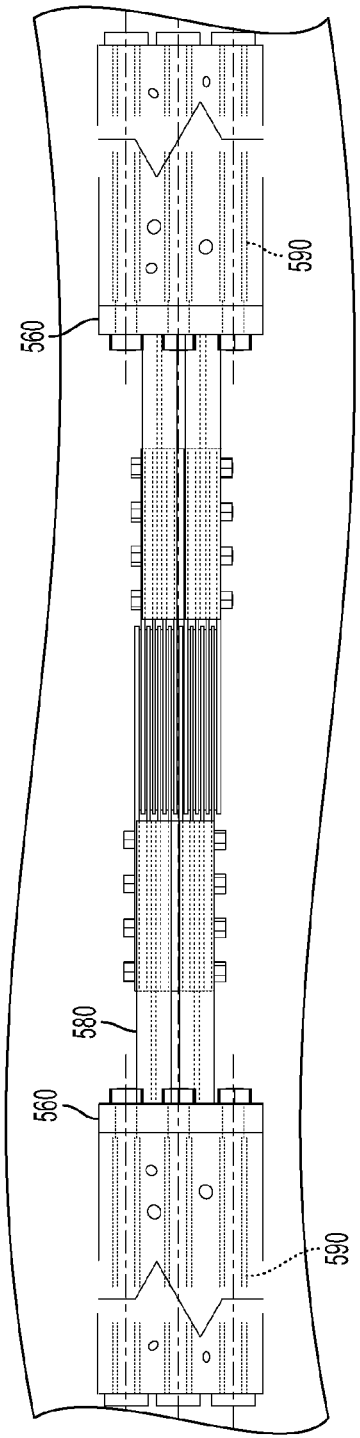

Referring now to FIG. 5, there is shown another embodiment of the invention in which fuse members 520 and 530 are made up of an axial force limiting member 595 running through a duct 590 embedded in the vertical elements 505, 510, and attached to the end-plate connector 560. In operation, the axial force limiting members 595 limit the axial forces transmitted to the damper when the predefined load limit is reached. The axial yielding of the members 595 allows for a limit on the loads imparted in the damping system.

Various means for connecting the various fuse members described above to the vertical elements are contemplated by the invention. Advantageously, in some embodiments as will be apparent in their respect descriptions below, the means for connecting is preferably provided to permit the removal, repair and/or replacement of the coupling members, in part or in their entirety, following an incident of elevated loading in which the force limiting members are activated by reaching the predefined force limit.

Figure 9:
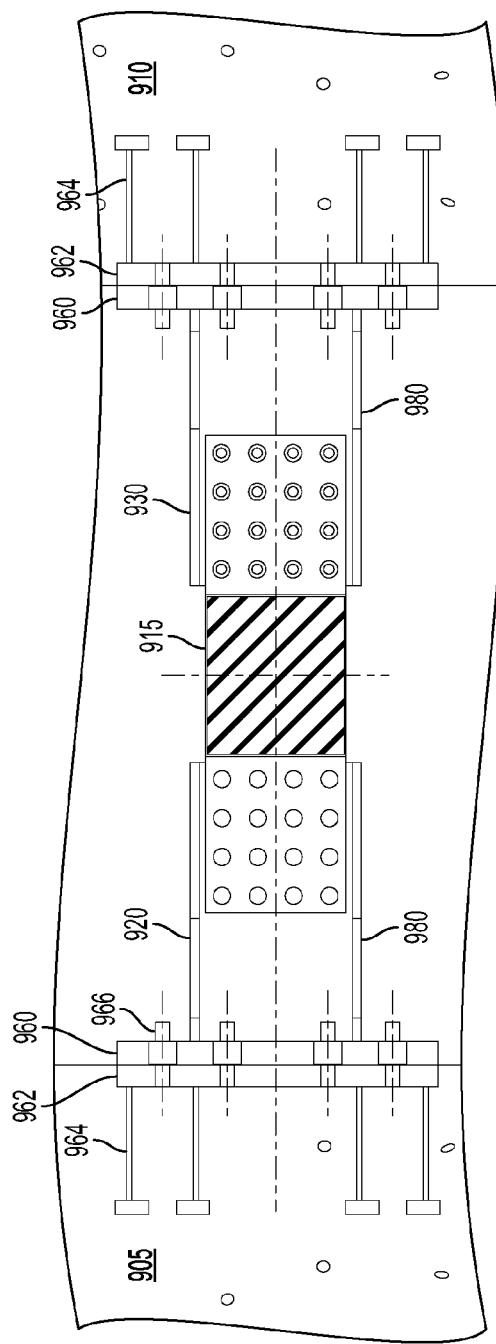
FIG. 9 is a front view of a means for replaceably connecting the various embodiments of FIGS. 2 to 7 to verticals in a building structure.

One embodiment of a replaceable coupling member is shown in FIG. 9. The coupling member 915 is illustrated as corresponding to coupling member 215 in FIGS. 2A and 2B, but may be any of the coupling members described in the various embodiments above. In this embodiment, an end plate 960 is provided, and attached to the fuse members 920, 930. A corresponding plate 962 is positioned and affixed within the vertical elements 905, 910. The plate 962 may be cast into the concrete vertical elements, for example. Steel studs 964 preferably maintain the plate 962 cast into the vertical elements. Connecting members, such as bolts 966, rigidly connect the end plate 960 to the plate 962. In operation, the coupling member 915 is easily removable or replaceable in the event of an elevated or catastrophic loading event that results in permanent damage to any portion of the coupling member 915.

Figure 10:
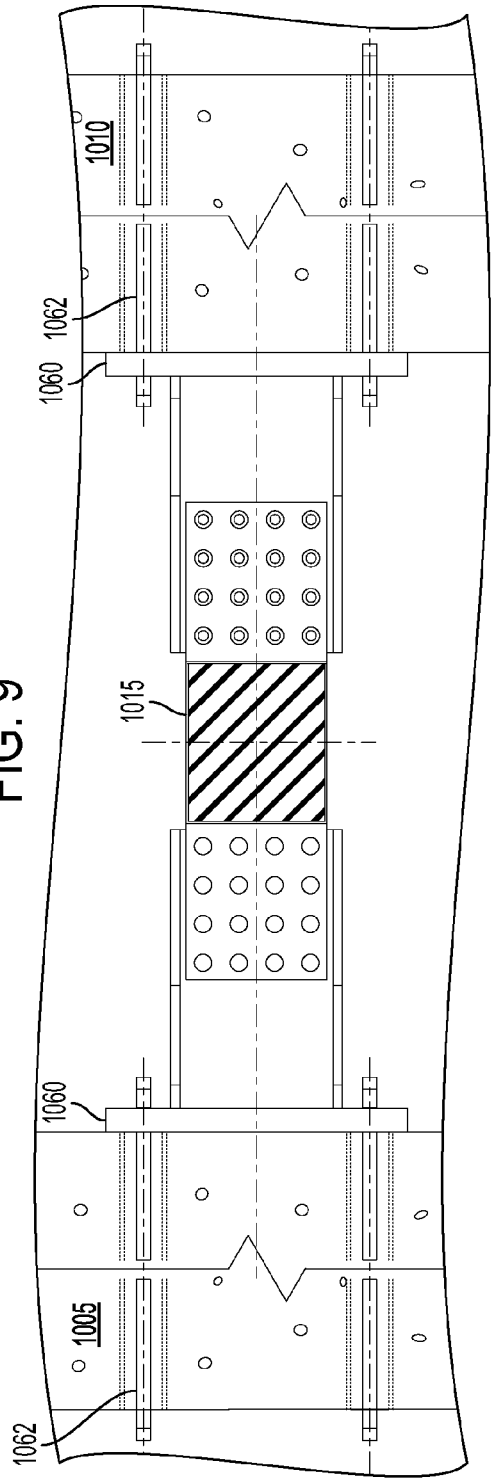
FIG. 10 is a front view of a means for replaceably connecting the various embodiments of FIGS. 2 to 7 to verticals in a building structure.

Referring to FIG. 10, there is shown another embodiment of a replaceable coupling member 1015, in which an end-plate 1060 is provided with holes therethrough for positioning post-tensioning members 1062 that are tensioned through an outer surface of the vertical elements 1005, 1010. FIG. 11 illustrates an embodiment in which threaded rebars 1162 are embedded in the vertical elements and threaded into end-plate couplers 1165 that are welded to end-plate 1160 which is rigidly connected to the coupling member 1115.

Figure 15:
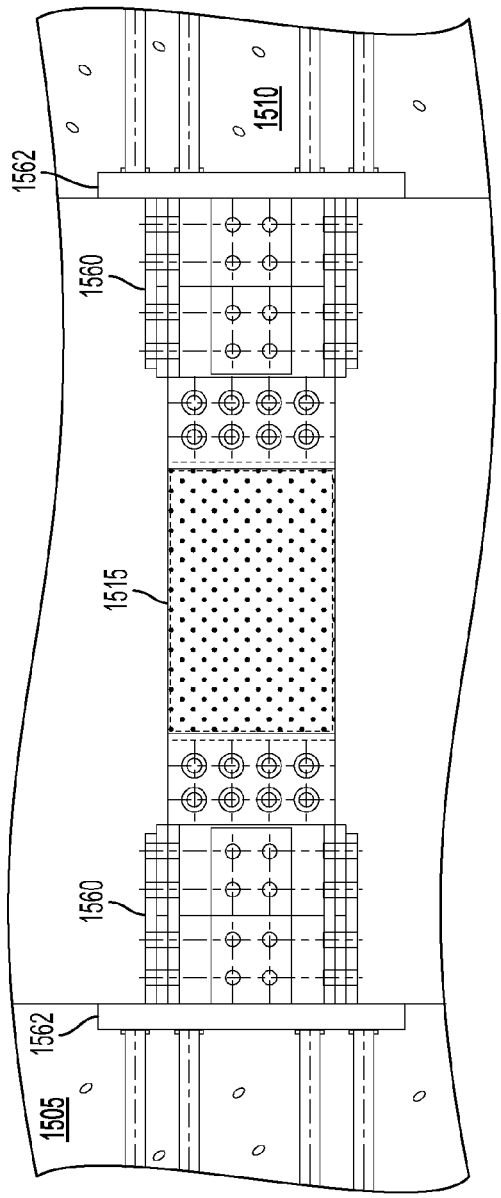
FIG. 15 illustrates an alternate means for connecting various embodiments of FIGS. 2 to 7 to verticals in a building structure.
Figure 16:
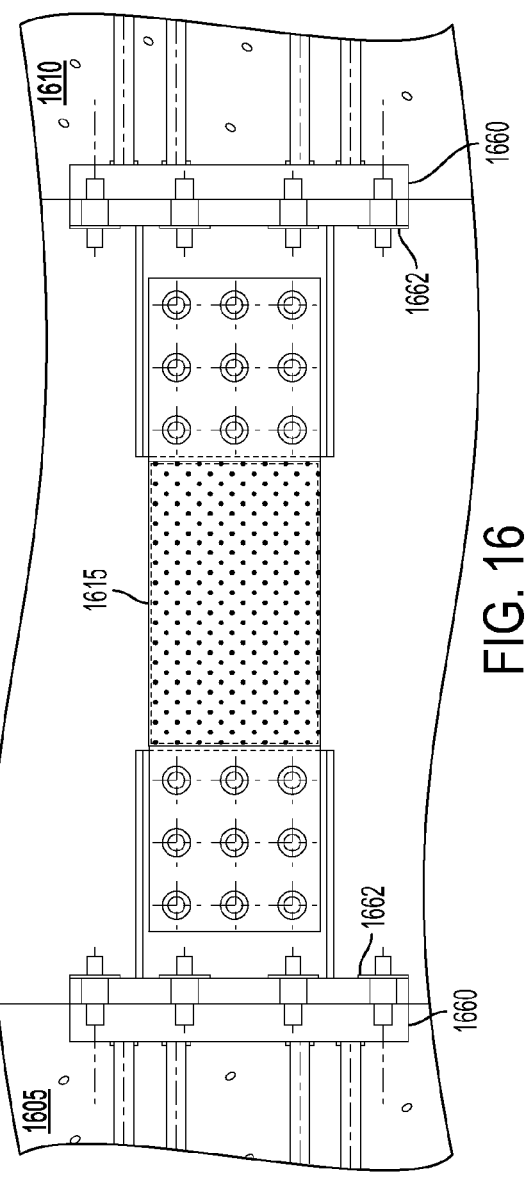
FIG. 16 illustrates an alternate means for connecting various embodiments of FIGS. 2 to 7 to verticals in a building structure.

FIG. 12 shows an embodiment in which a built-up I-beam 1260 is built into the vertical elements 1205, 1210. FIG. 13 illustrates an embodiment in which a concrete bracket portion 1360 is formed integrally with the vertical elements 1305, 1310 to be directly connected to the coupling member 1315, for example with bolts 1362. Details of the coupling member 1315 are not shown in this figure for ease of illustration and to maintain clarity. The embodiment of FIG. 14 shows a cast-in plate 1460, attached with rebars 1462, and having a portion of the cast-in plate 1460 extend beyond an inner wall 1407 of the vertical elements 1405, 1410 such that the coupling member 1415 may be welded to the cast-in plate 1460. FIG. 15 illustrates an embodiment where splice plates 1560 are used to connect the coupling member 1515 with end plates 1562 that have been built-up into, or otherwise attached to, the vertical elements 1505, 1510. FIG. 16 shows an embodiment similar to FIG. 15, but rather than using splice plates, a cast-in place plate 1660 is attached to the vertical elements 1605, 1610 and attached to end plates 1662 that may be bolted to the cast-in place plate.

Figure 17:
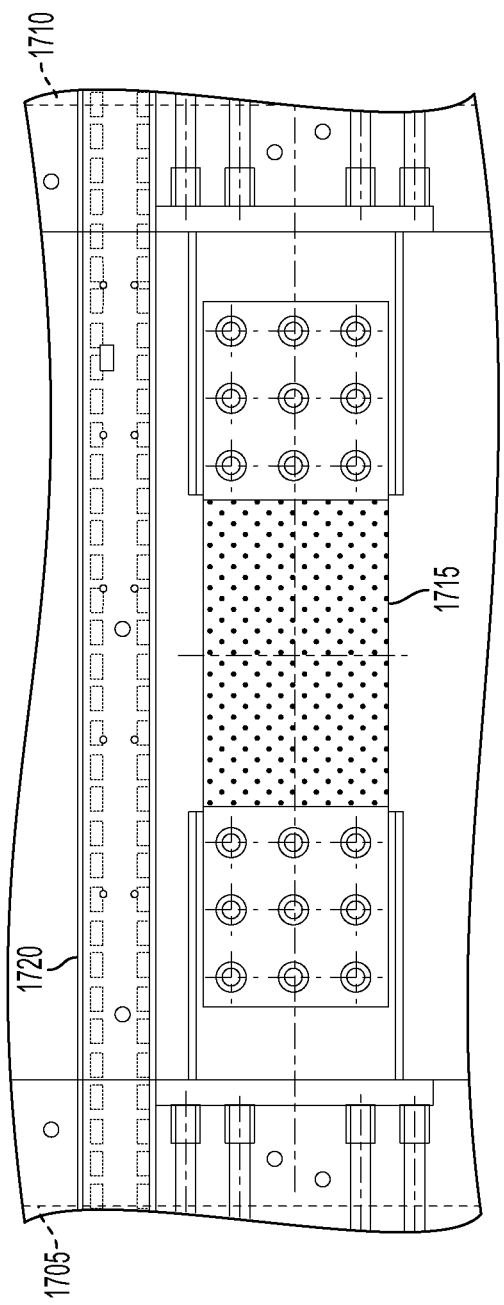
FIG. 17 is a front view of a traditional slab used in combination with the coupling member of the invention.

One of the implementation details of the coupling member as herein described results in its interaction with concrete slabs common as structural elements in buildings. Concrete slabs are typically used to construct floors and ceilings. Concrete slabs are generally known in the art and accordingly, are not described in more detail herein. However, it is prudent to consider the arrangements of a concrete slab in the context of the use of a coupling member according to the invention. FIG. 17 illustrates a traditional slab 1720 rigidly connected to the vertical elements 1705, 1710 as is known in the art. The slab 1720 is preferably spaced from the coupling member 1715 in a vertical direction such that there is no interference between the slab 1720 and the coupling member 1715, even when the coupling member 1715 is subjected to elevated loading conditions. FIGS. 18A and 18B illustrate an embodiment in which a flexible membrane 1802 is also employed, along with a traditional slab 1820 as is known in the art. The flexible membrane 1802 decreases the stiffness of the slab in order to increase the damper efficiency. FIGS. 19A and 19B illustrate a drop panel slab 1920, rather than a traditional cast slab of FIG. 17. The drop panel 1920 may be removed for inspection of the coupling member 1915.

Figure 6:
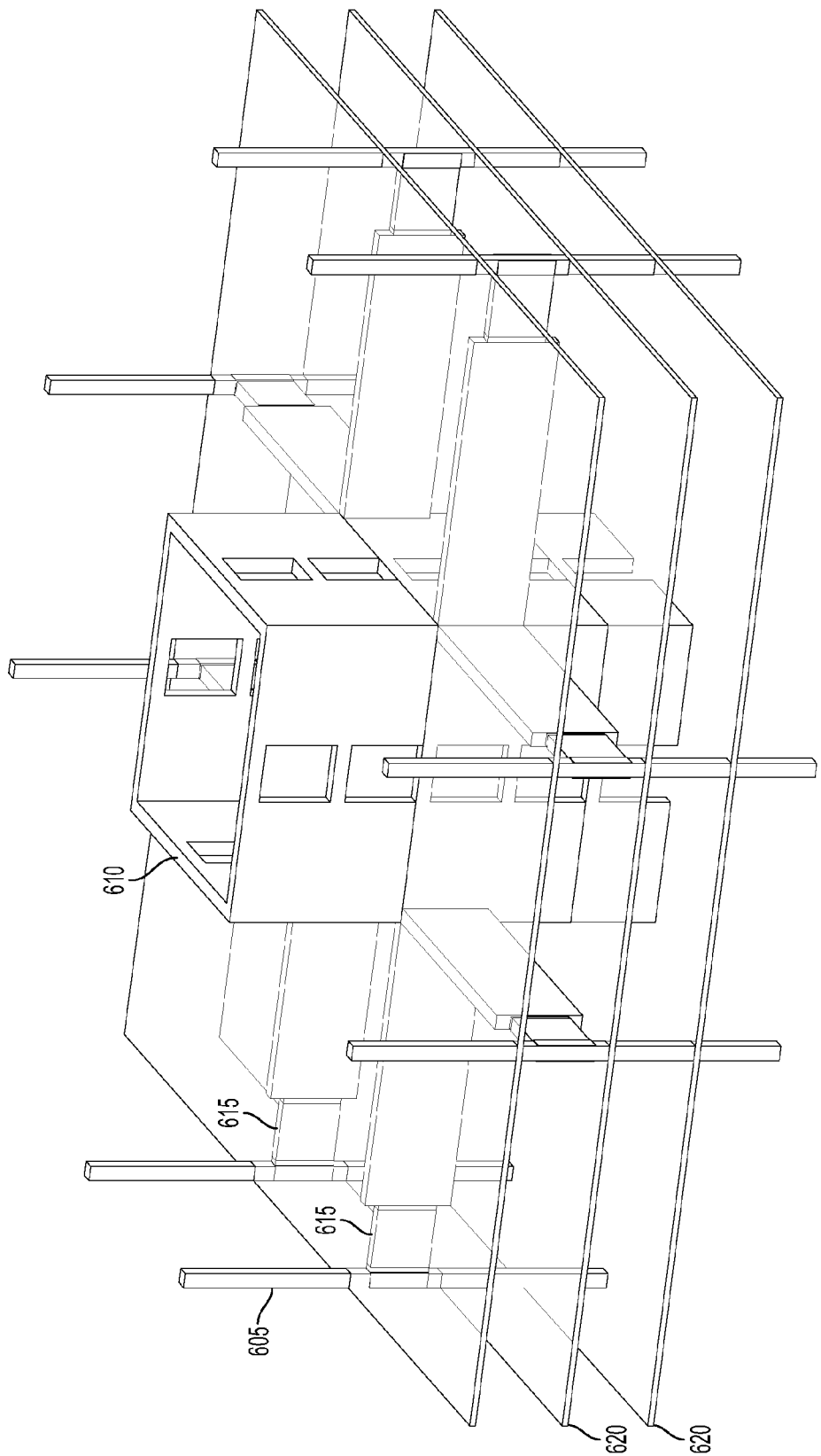
FIG. 6 shows an outrigger building configuration to which embodiments of the invention may be applied.
Figure 7:
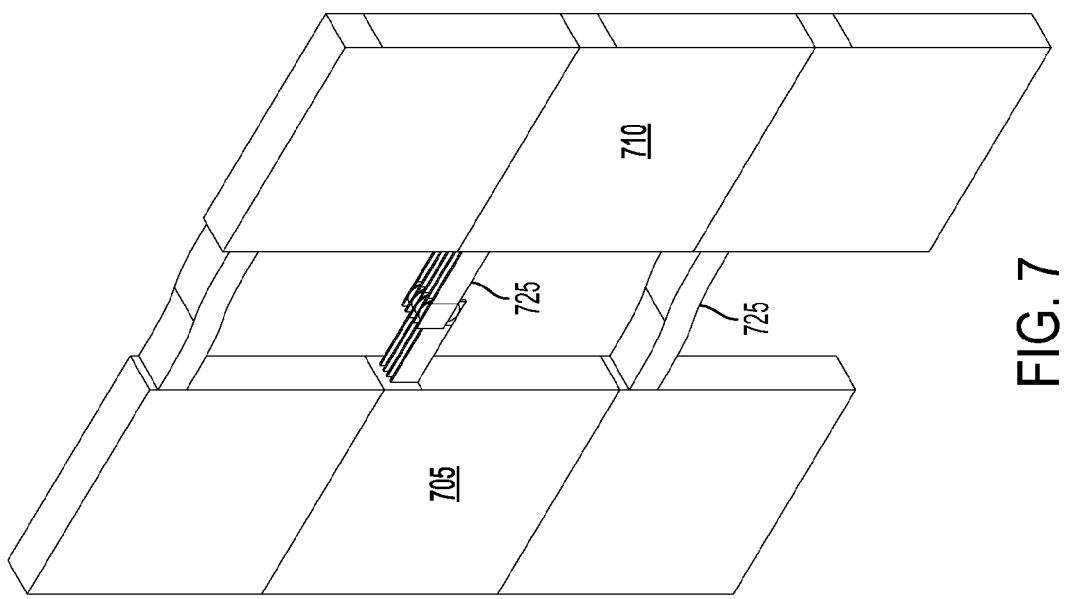
FIG. 7 shows a building structure in which embodiments of the invention may be applied.
Figure 8A:
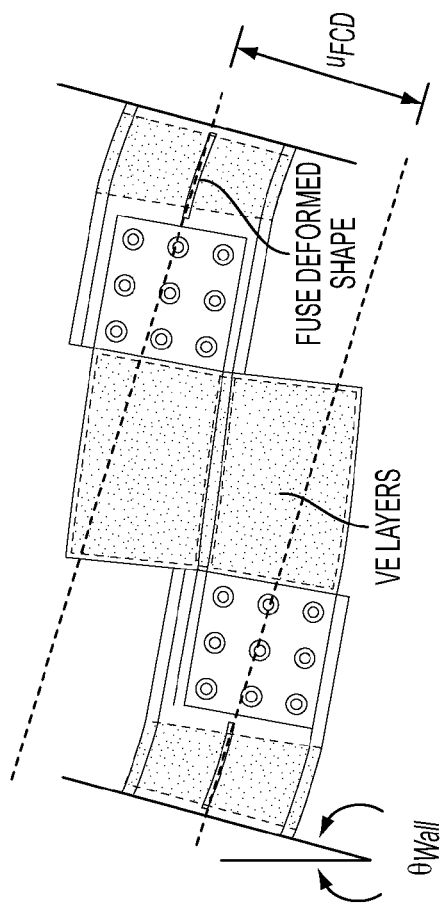
FIG. 8A is a schematic illustration of operation of the embodiment of FIG. 2A and, with related system response graphs shown in FIGS. 8B-8D.
Figure 8D:
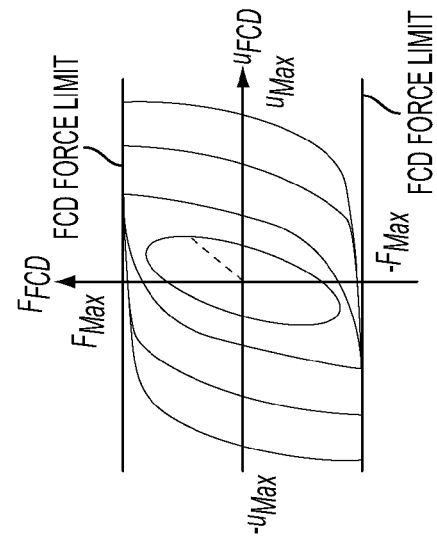
Figure 8C:
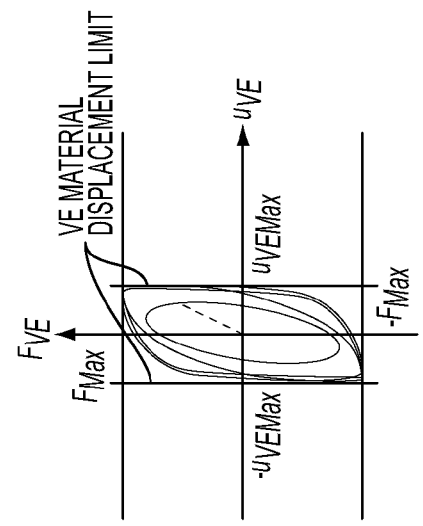
Figure 8B:
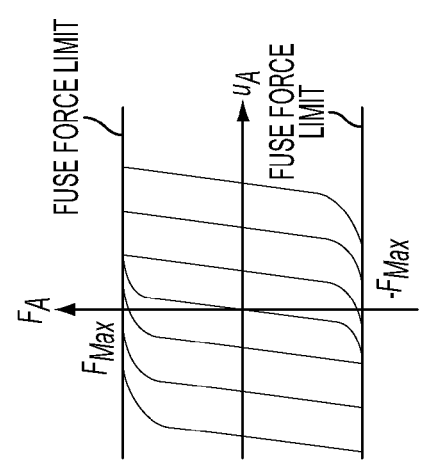

While the invention as described above relates to a coupling member for connecting two vertical elements in a building structure, applicant notes that the coupling member as herein described may be used or otherwise applied to various implementations where damping vibrations due to lateral loads may be required. In this sense, the term vertical elements as used throughout this description is intended to be construed broadly to include any structural elements that provide support due to lateral loads being applied to the building structure. Building structures of various types may benefit from the vertical element as herein disclosed. For example, referring to FIG. 6, there is shown an outrigger building configuration, where a central building vertical 610 has a plurality of outer vertical elements 605 spaced therefore, with the coupling member 615 adjoining each of the outer vertical elements 605 to the central building vertical 610. Various floors 620 in the building structure are also shown. It will be apparent that the coupling member 615 is illustrated schematically only, and could be any of the coupling members as described with respect to FIGS. 2 to 5. Furthermore, the connection means for coupling to the verticals 605, 610 may be as herein described. FIG. 7 shows a general implementation of the invention in which coupling members 725 are used to connect two verticals 705, 710 in a building structure.

The invention also provides for a method of connecting vertical elements in a building structure as heretofore described, by providing a coupling member according to any one of the various embodiments of the invention, and rigidly connecting two vertical elements in a building structure with the coupling member.

While the invention may be implemented using various damping members, surprising results have been discovered with respect to the combination of the damping member as described with respect to the preferred embodiments, where the risk of permanent deformation due to elevated shear forces or moments is more pertinent. That is, in the damping member of FIGS. 2A, 2B and 2C, where a plurality of plates are connected with a damping material therebetween, when subjected to excess shear or moments, or other, forces beyond that result in a damage incident. Generally, a damage incident would also include one at which the failure of the coupling element itself could be catastrophic. As previously stated, a damage incident is one that would cause permanent, near permanent and similar damage that renders the damping element inefficient. Such damage incidents include, but are not limited to, one or more of a ripping of the damping material in the damping element, debonding of damping material from a plate to which the damping material is connected, failure of a plate forming part of the damping element, failure of a means for connecting elements in the damping element, failure of a weld connecting the damping element or the column element, failure of vertical elements, and failure of a connecting means for the coupling member, failure of the vertical elements to which the damping device is connected or and combination of same.

As will be appreciated by a person skilled in the art, although the fuse element does limit the forces that are applied on the damping element, there is still a small increase in the force as the yielding element deforms primarily due to strain hardening in the steel. This is very small and can be considered negligible for the purposes of this invention.

EXAMPLE

In the Example that follows, coupling members incorporating the preferred damping elements as herein described are tested as described below, with and without the fuse portion according to the invention. Further details are provided below. In the examples, reference is made to FCDs or fork configuration dampers, which refer to dampers of the type described in the preferred embodiments that incorporate two sets of a plurality of plates interdigitated with other and a damping material disposed between each pair of interdigitated plates.

Tests were conducted on two Fork Configuration Dampers (FCDs) in the laboratory at Ecole Polytechnique in Montreal. There were two different specimens tested; the first (FCD-A) was designed for inclusion in an 85-storey building and did not include a fuse portion according to the invention. The second (FCD-B) was designed for inclusion in a 50-storey building and did include a fuse portion according to the invention, such as that shown in FIGS. 2A, 2B and 2C. Both buildings were designed for two FCDs in parallel replacing a single reinforced concrete coupling beam.

For this example, the dampers for the FCD-B were designed to have the capacity to undergo much larger displacements (have more ductility) than the dampers designed for the FCD-A. The FCD-B specimen had 2-flexural force limiting fuse members (a reduced beam section) prior to the steel end-plates. The reduced beam sections are strategically sized to ensure that they are the weakest link and damage is concentrated within them. In doing so they ensure undesirable failure mechanisms will not occur, such as concrete wall failure, weld failures or damping material tearing.

Figure 20B:
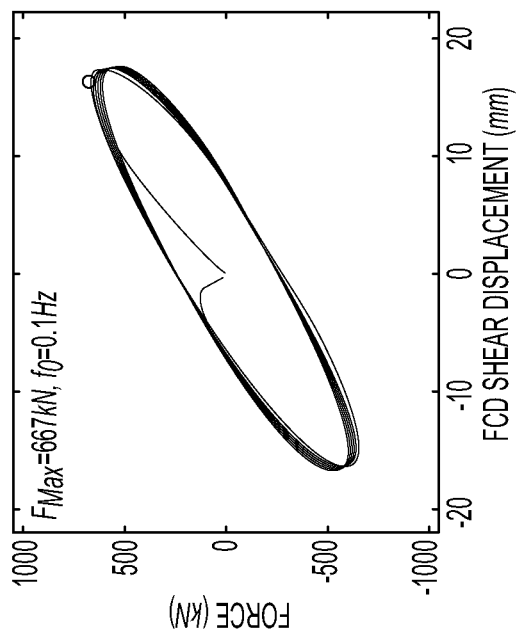
Figure 20A:
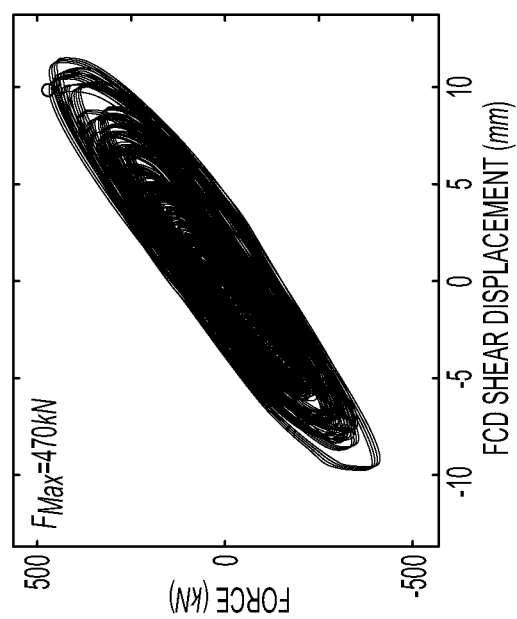

The fuse portions are designed to remain elastic (not activate) under low level displacements and wind loadings. Series of wind tests and were conducted on the FCD-B specimen, FIG. 20A shows the FCD shear forces vs. shear displacement under wind tests and FIG. 20B shows the FCD shear force vs. shear displacement under harmonic loading at a frequency of f=0.1 Hz. The fuse portions are not activated on either of these loads.

Figure 21B:
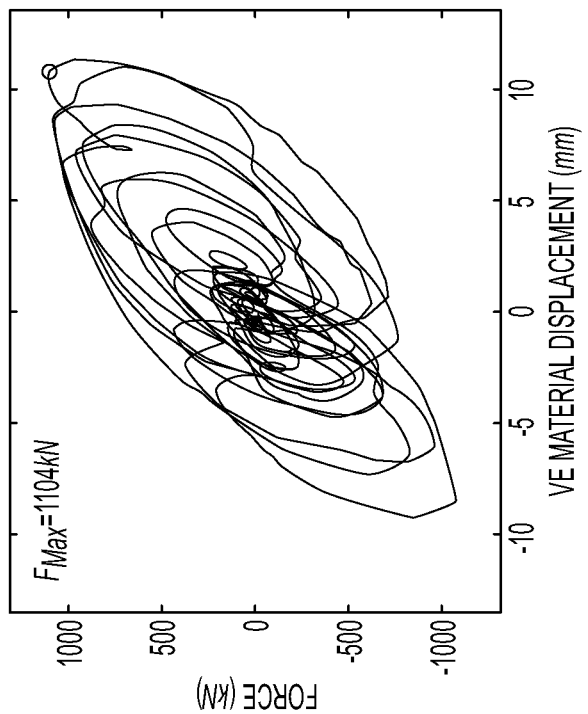
Figure 21A:
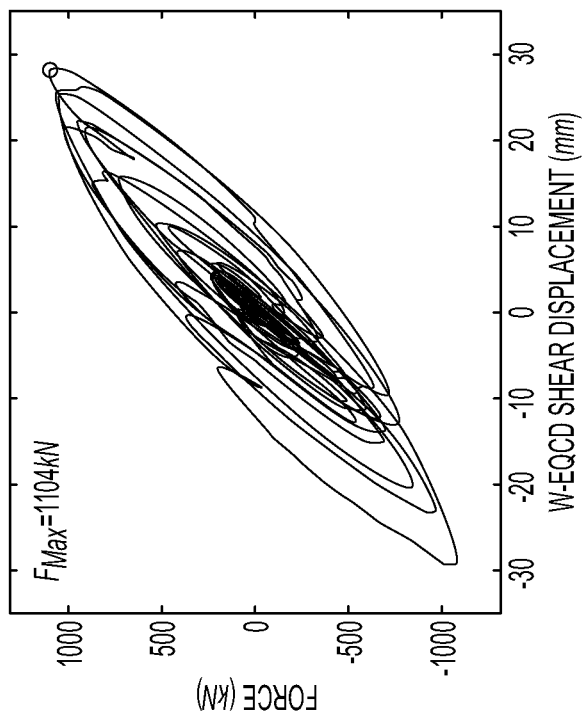

Series of large amplitude earthquake tests were conducted on the FCD-B specimen, as well, for which the fuse members were designed to begin activation. FIG. 21A shows the FCD shear force vs. shear displacement and FIG. 21B shows the damping member shear force vs. shear displacement subject to an analytically simulated Northridge earthquake (1994). The figures show the onset of fuse member activation which is beginning to limit the FCD shear force, and the damping member deformation.

Figure 22B:
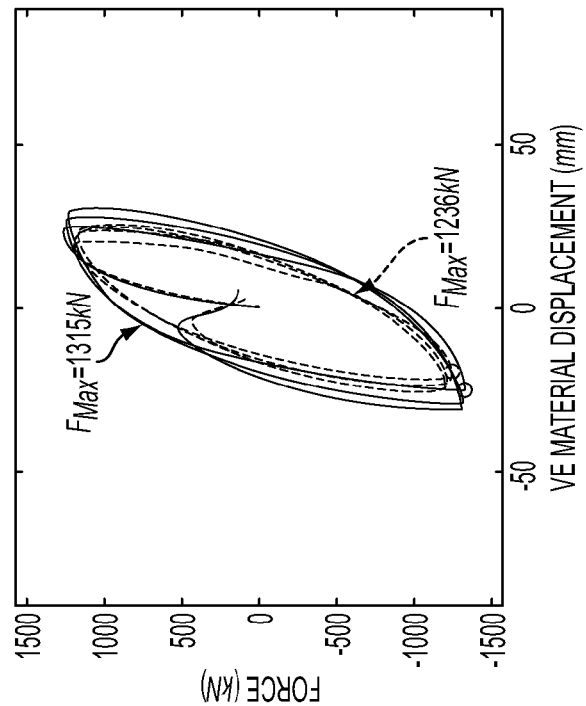
Figure 22A:
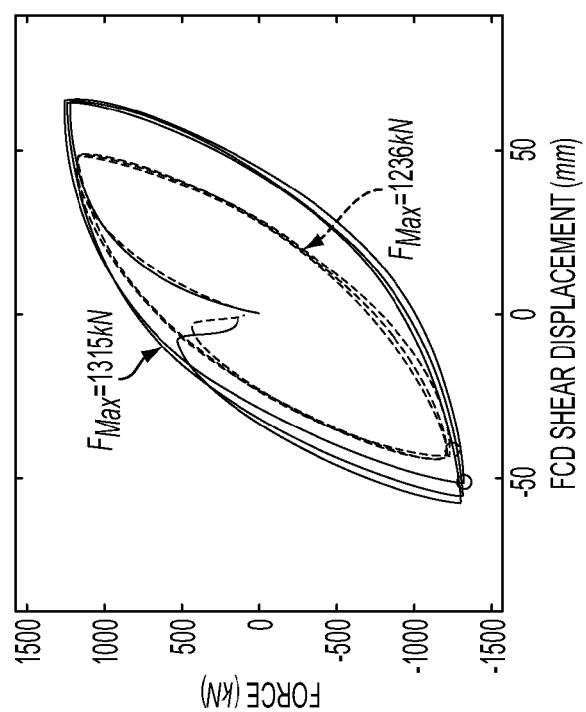

Series of increasing amplitude harmonic tests were conducted where the FCD specimen "fuse" is activated at a frequency $f_0$=0.2 Hz, showing a viscoelastic-plastic FCD response. This "fuse" activation limits both the FCD shear force as well as the VE material shear deformation. FIG. 22A shows the FCD shear force vs. shear displacement and FIG. 22B shows the damping material shear force vs. shear displacement.

Figure 23B:
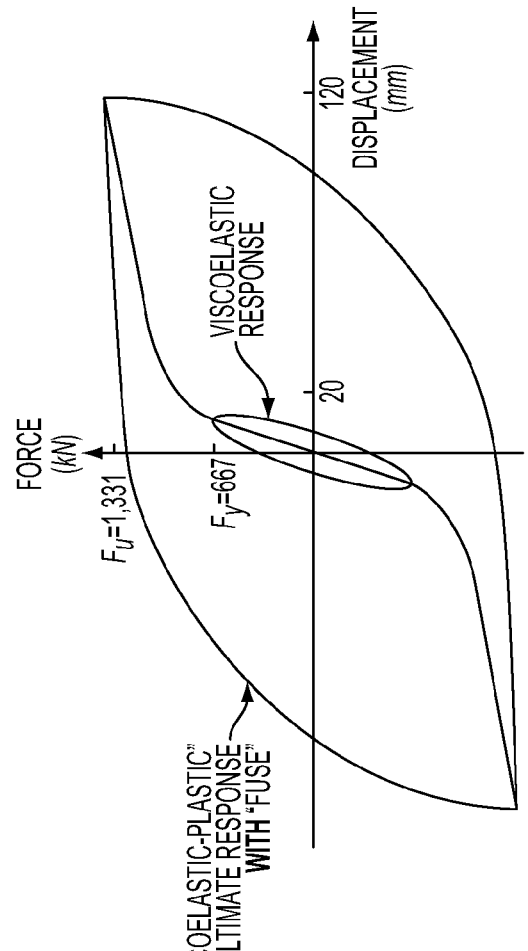
Figure 23A:
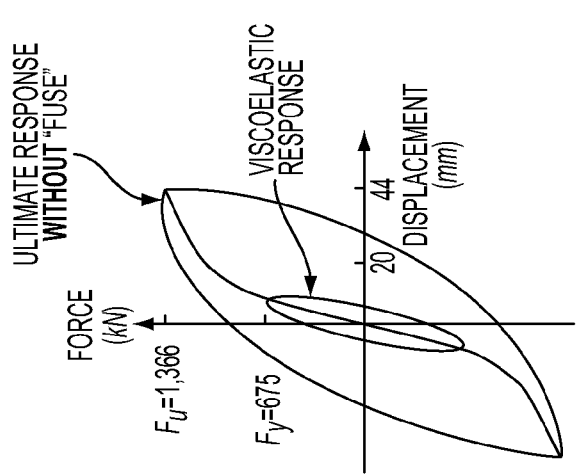

Shear force versus shear displacement test profiles for the FCD-A and FCD-B are shown in FIGS. 23A and 23B, respectively. These test profiles show envelopes of the tests conducted. As can be seen, there is a distinct viscoelastic response envelope, for which the response of the damper is viscoelastic in nature. When the shear force reaches the yield force of the steel ($F_y$=675 kN for FCD-A and $F_y$=667 kN for FCD-B), the steel sections of the dampers begin to yield concentrated damage in the steel. For FCD-A the steel yielding is initiated at the toe of the weld at the connection to the end plate and for FCD-B the steel yielding is in the reduced beam section of the FCD-B in flexure, forming a "ductile" fuse mechanism. This plastic behavior of the steel reduced beam sections ensures that the desired ductile force limiting mechanism occurs. The total displacement response of the damper is made up as a combination of shear displacement of the VE material, plus the ductile flexural plastic fuse deformation in FCD-B and the less ductile failure of the steel in FCD-A. As can be seen in the figures, the ductile "fuse" in FCD-B leads to a much larger shear deformation capacity of ~120 mm for FCD-B compared to ~44 mm for FCD-A, while the ultimate force is almost equivalent $F_u$=1,331 kN for FCD-B and $F_u$=1,366 kN for FCD-A. These ultimate response envelopes are obtained from full-scale test results and as can be seen the maximum force is limited by ensuring undesirable failure mechanisms do not occur.

The scope of the claims should not be limited by the preferred embodiments set forth in description of the preferred embodiments or in the examples, but should be given the broadest interpretation consistent with the description as a whole.

What is claimed is:

1. A building structure including a plurality of vertical elements extending vertically from a ground surface with at least a first of said vertical elements connected to a second of said vertical elements by a coupling member, said coupling member comprising:
   a damping element for damping vibrations in said building structure resulting from relative movement between said first and second vertical elements due to lateral loads applied to the building structure, whereby said damping element undergoes deformation due to said relative movement; said damping element comprising first and second sets of two or more plates each, wherein the plates in said first set are interdigitated with the plates in said second, and spaced from each other in a direction substantially parallel to the ground surface, and a damping material disposed between each plate in said sets of plates;
   at least one of a first and second fuse member connected to at least one of first and second ends of said damping element respectively; said fuse member selected from a material, and otherwise sized and dimensioned to exhibit semi-rigid behavior when said damping element undergoes deformation due to loads below a predetermined load limit and to undergo deformation when loads reach said predetermined load limit, such that said damping element is prevented from deforming due to loads above said predetermined load limit;
   first and second connecting means for rigidly connecting said first and second fuse members to said first and second vertical elements, respectively.

2. A building structure according to claim 1, wherein said damping material comprises a viscoelastic material; said damping element damping vibrations as said damping element undergoes shear deformation as each plate in said set of plates is displaced in a vertical direction under resistance of said damping material.

3. A building structure according to claim 2 wherein said predetermined load limit is selected at a load limit at which a damage incident occurs; wherein a damage incident is selected from the group comprising a ripping of the damping material, debonding of damping material from a plate in said sets of plates, failure of a plate in said sets of plates, failure of a means for connecting said sets of plates, failure of a weld, failure of said connecting means, failure of vertical elements to which the damping system is connected and combination of same.

4. A building structure according to claim 1, wherein at least one or both of said fuse members comprises a beam portion and a stiffener portion functionally connected to said beam portion, wherein said stiffener portion is adapted to stabilize said beam portion when said lateral loads reach said predetermined load limit.

5. A building structure according to claim 4, wherein said beam portion comprises a reduced beam section.

6. A building structure according to claim 4, wherein said stiffener portion comprises a reinforcing member connected to said beam portion and arranged in parallel with said ground to stabilize said beam portion against buckling during flexural yielding in said beam portion.

7. A building structure according to claim 4, wherein said stiffener portion comprises at least one reinforcing member connected to said beam portion and arranged in parallel with said vertical elements to stabilize said beam portion against buckling during shear yielding in said beam portion.

8. A building structure according to claim 1, further comprising a static stiffness increasing structural member attached to a top surface of said damping element.

9. A building structure according to claim 8, where said static stiffness increasing member comprises a steel plate.

10. A coupling member for use in a building structure comprising
    a damping element for damping vibrations in said building structure resulting from relative movement between said first and second vertical elements due to lateral loads applied to the building structure, whereby said damping element undergoes deformation due to said relative movement; wherein said damping element comprises a set of two or more plates spaced from each other in a direction substantially parallel to the ground surface, and a damping material disposed between each plate in said set of plates;
    at least one of a first and second fuse member connected to at least one of first and second ends of said damping element respectively; said fuse member selected from a material, and otherwise sized and dimensioned to exhibit semi-rigid behavior when said damping element undergoes deformation due to loads below a predetermined load limit and to undergo deformation when loads reach said predetermined load limit, such that said damping element is prevented from deforming due to loads above said predetermined load limit;
    first and second connecting means for rigidly connecting said first and second fuse members to said first and second vertical elements, respectively.

11. A coupling member according to claim 10, wherein said damping material comprises a viscoelastic material; said damping element damps vibrations as said damping element undergoes shear deformation as each plate in said set of plates is displaced in a vertical direction under resistance of said damping material.

12. A coupling member according to any claim 11 wherein said predetermined load limit is selected at a load limit at which a damage incident occurs; wherein a damage incident is selected from the group comprising a ripping of the damping material, debonding of damping material from a plate in said sets of plates, failure of a plate in said sets of plates, failure of a means for connecting said sets of plates, failure of a weld, failure of said connecting means, failure of vertical elements to which damping system is attached and combination of same.

13. A coupling member according to claim 10, wherein at least one or both of said fuse members comprises a beam portion and a stiffener portion functionally connected to said beam portion, wherein said stiffener portion is adapted to stabilize said beam portion when said lateral loads exceed said predetermined load limit.

14. A coupling member according claim 13, wherein said beam portion comprises a reduced beam section.

15. A coupling member according to claim 13, wherein said stiffener portion comprises a reinforcing member connected to said beam portion and arranged in parallel with said ground to stabilize beam webs against buckling in said beam portion when said portion of the beam is yielding in flexure.

16. A coupling member according to claim 13, wherein said stiffener portion comprises at least one reinforcing member connected to said beam portion and arranged in parallel with said vertical members to stabilize said beam portion against buckling in said beam portion.

17. A coupling member according to claim 10, further comprising a static stiffness increasing member attached to a top surface of said set of two or more plates.

18. A coupling member according to claim 17, where said static stiffness increasing plate member comprises a steel plate.

19. A method for damping vibrations caused by lateral loads being applied to a building structure comprising
providing a damping element for damping vibrations in said building structure resulting from relative movement between said first and second vertical elements due to lateral loads applied to the building structure, said damping undergoing deformation due to said relative movement; wherein said damping element comprises a set of two or more plates spaced from each other in a direction substantially parallel to a ground surface, and a damping material disposed between each plate in said set of plates;
providing at least one of a first and second fuse member connected to at least one of first and second ends of said damping element respectively; said fuse member selected from a material, and otherwise sized and dimensioned to exhibit semi-rigid behavior when said damping element undergoes deformation due to loads below a predetermined load limit and to undergo deformation when loads exceed said predetermined load limit, such that said damping element is prevented from deforming due to loads above said predetermined load limit; and,
rigidly connecting said first and second fuse members to said first and second vertical elements.

20. A method according to claim 19, wherein said damping material comprises a viscoelastic material; said damping element damps vibrations as said damping element undergoes shear deformation as each plate in said set of plates is displaced in a vertical direction under resistance of said damping material.

21. A method according to claim 19, wherein at least one or both of said fuse members comprises a beam portion.

22. A method according to claim 19, wherein at least one or both of said fuse members comprises a beam portion and a stiffener portion functionally connected to said beam portion, wherein said fuse portion is adapted to yield before said damping element reaches said predetermined load limit, and wherein said beam portion is adapted to undergo deformation after said damping element reaches said predetermined load limit.

23. A method according to claim 22, wherein said stiffener portion comprises a reinforcing member connected to said beam portion and arranged in parallel with said ground.

24. A method according to claim 22, wherein said stiffener portion comprises at least one reinforcing member connected to said beam portion and arranged in parallel with said vertical elements.

* * * * *